(12) United States Patent
Fujita et al.

(10) Patent No.: US 8,164,793 B2
(45) Date of Patent: Apr. 24, 2012

(54) IMAGE PROCESSING APPARATUS AND METHOD

(75) Inventors: Shigeru Fujita, Yokohama (JP); Hiroki Horikoshi, Komae (JP); Yasunori Fujimoto, Inagi (JP); Shinichi Miyazaki, Kawasaki (JP); Akira Ichimura, Tokyo (JP); Hironori Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 12/511,773

(22) Filed: Jul. 29, 2009

(65) Prior Publication Data
US 2010/0026746 A1    Feb. 4, 2010

(30) Foreign Application Priority Data
Jul. 31, 2008  (JP) ................................. 2008-197771

(51) Int. Cl.
*G06K 1/00* (2006.01)
*H04N 1/46* (2006.01)
*B41J 29/38* (2006.01)
*B41J 2/015* (2006.01)

(52) U.S. Cl. ............. 358/1.9; 358/501; 358/502; 347/5; 347/6; 347/14; 347/15; 347/20

(58) Field of Classification Search ............ 358/1.9, 358/501, 502; 347/5, 6, 14, 15, 20
See application file for complete search history.

(56) References Cited

U.S. PATENT DOCUMENTS

| 5,289,210 | A | * | 2/1994 | Takayanagi | ................ 347/14 |
| 5,812,176 | A | * | 9/1998 | Kawabe et al. | ........... 347/240 |
| 6,315,387 | B1 | | 11/2001 | Horikoshi | |
| 6,511,143 | B1 | | 1/2003 | Ishikawa et al. | |
| 6,906,825 | B1 | * | 6/2005 | Nakahara et al. | .......... 358/1.9 |
| 7,506,949 | B2 | * | 3/2009 | Shimoji | .................. 347/15 |
| 2009/0244580 | A1 | | 10/2009 | Fujimoto et al. | |

FOREIGN PATENT DOCUMENTS

| EP | 0595517 A1 | 5/1994 |
| JP | 06-191041 A | 7/1994 |
| JP | 07-52390 A | 2/1995 |
| JP | 2000-103088 A | 4/2000 |
| JP | 2006-231736 A | 9/2006 |

\* cited by examiner

*Primary Examiner* — Charlotte M Baker
(74) *Attorney, Agent, or Firm* — Fitzpatrick, Cella, Harper & Scinto

(57) ABSTRACT

In a multipass printing that performs a plurality of printing scans over a unit area of a print medium by using a leading head and a follower head, the multivalued image data for the leading head is distributed according to the print volume information for up to the preceding printing scan. Then, the multivalued image data for the leading head is subjected to the grayscale level reduction operation to generate binary data. Based on the binary data, the print volume information is updated, after which the multivalued image data for the follower head is distributed according to the print volume information. This causes a plurality of printing scans or a plurality of print heads, that print the same unit area, to have a correlation among them, with the result that dots on a plurality of planes when overlapped have an excellent scattering characteristic.

6 Claims, 18 Drawing Sheets

|  1/16 | 2/16 | 1/16 |
|---|---|---|
| 2/16 | 4/16 | 2/16 |
| 1/16 | 2/16 | 1/16 |

FIG.9A

| 16 | 32 | 16 |
|---|---|---|
| 32 | 64 | 32 |
| 16 | 32 | 16 |

FIG.9B

IMAGE PROCESSING APPARATUS AND METHOD

BACKGROUND OF THE INVENTION

1. Field of the Invention

The present invention relates to an image processing apparatus and method which, when a printing apparatus prints on a print medium, reduces density unevenness resulting from print characteristic variations among a plurality of printing elements in a print head, from undulations of print head scans or from print medium conveying operations.

2. Description of the Related Art

As an example of printing system using a print head having a plurality of printing elements, an ink jet printing system has been known which ejects ink from the individual printing elements to form dots on the print medium.

A serial type ink jet printing apparatus progressively forms an image by repetitively alternating a printing scan, which moves a print head ejecting ink at a predetermined frequency over a print medium at a speed that matches the frequency, and a print medium conveying operation, which conveys the print medium in a direction that crosses the direction of the printing scan.

In a print head having a plurality of printing elements arrayed therein, some variations unavoidably occur among printing elements during a manufacturing process. Such variations show up as ejection characteristic variations, such as ink ejection volume variations and ink ejection direction variations, rendering the shapes of dots formed on a print medium unequal, thereby inducing density (or grayscale) unevenness and stripes on the printed image.

In an attempt to address this problem, the serial type ink jet printing apparatus adopts a characteristic multipass printing. The multipass printing prints an image by dividing the pixels that the print head can print in one printing scan into two or more groups of image data and printing them progressively in a plurality of printing scans, with the paper conveying operation interposed in between. This printing method, if there are ejection characteristic variations among individual printing elements, can prevent dots printed by one printing element from continuing in the main scan direction and thereby disperse the influences of ejection characteristics of individual printing elements over a wide area, producing a uniform, smooth image. The desirable effect of such a multipass printing increases with a number of passes, that is the number of printing elements set to print one main scan line. It is noted, however, that an increased number of passes results in a reduced print speed. So, a serial type printing apparatus often provides a plurality of print modes with different numbers of passes, such as one giving priority to an image quality and one giving priority to a print speed. Further, in recent years, a printing apparatus has come to be marketed which has a plurality of printing element arrays (or print heads) arranged side by side in the main scan direction to eject the same inks in order to realize a relatively high-speed image output even while performing the multipass printing.

When such a multipass printing is performed or a plurality of print heads are used, print data needs to be distributed to individual printing scans or individual print heads. Such a print data distribution conventionally has often been done by using a mask pattern that has a predetermined pattern of pixels (1) that permit a dot to be printed therein and pixels (0) that do not.

FIG. 2 is a schematic diagram showing an example of mask pattern that may be used in a 2-pass printing. Areas painted black represent pixels (1) that permit a dot to be printed therein and blank areas represent pixels (0) that do not permit a dot to be printed therein. Denoted 201 is a mask pattern used in a first pass of printing scan and 202 a mask pattern used in a second pass of printing scan. The first-pass pattern 201 and the second-pass pattern 202 are in a complementary relationship.

Binary image data to be printed is ANDed with the above-described mask patterns and the result of the AND operation constitutes binary data that will be actually printed by individual printing elements in their associated printing scans. However, since the distribution of pixels to be printed differs from one piece of binary image data to another, it is difficult to distribute the print data evenly among a plurality of printing scans or a plurality of printing element arrays at all times. As the percentage or frequency of a particular printing scan or a particular printing element array printing dots increases, the ejection characteristic of that printing scan or printing element array shows in a printed image, diminishing the intended advantage of the multipass printing. So, when performing the multipass printing, one important issue that needs to be resolved has been how the print data can be distributed among a plurality of printing scans or printing element arrays evenly and uniformly.

For example, Japanese Patent Laid-Open No. 7-52390 discloses a method for generating a mask pattern that has print-permitted pixels and print-not-permitted pixels randomly arrayed. The use of such a random mask pattern can be expected to distribute the print data almost evenly among a plurality of printing scans or a plurality of printing element arrays, by whatever quantization method the image data is binarized.

Further, Japanese Patent Laid-Open No. 6-191041 discloses a method which does not use a fixed mask pattern, such as shown in FIG. 2, but distributes print data among printing scans so that pixels to be printed adjoining continuously in the main scan direction or subscan direction are printed by as many different printing scans as possible.

FIG. 3 shows an example array of pixels to be printed in binary image data and a result of distributing the pixels to two printing scans according to the method described in Japanese Patent Laid-Open No. 6-191041. Having dots that run continuously in the main scan direction and subscan direction printed in different printing scans as described above can effectively alleviate not just image impairments caused by ink ejection characteristic variations among printing elements but also problems such as ink overflows.

As still higher image quality is being demanded of printed images in recent years although the above-described multipass printing has already been employed, grayscale variations and density unevenness caused by registration shifts or deviations among printing scans or among printing element arrays have come to be viewed as new problems. The registration shifts or deviations among printing scans or among printing element arrays are caused by variations in distance between a print medium and an ejection opening face of the print head (paper-print head distance) or by variations in distance that the print medium is conveyed, and appear as deviations between different planes that are printed by individual printing scans or printing element arrays.

Referring to FIG. 3, consider an example case in which a plane of dots (circle) printed in a preceding printing scan and a plane of dots (double circle) printed in a subsequent printing scan are shifted by one pixel in the main scan direction or subscan direction. In this case the dots (circle) printed in the preceding printing scan and the dots (double circle) printed in the subsequent printing scan completely overlap, exposing blank areas, lowering the grayscale level of the printed image.

Variations in distance between adjoining dots and in their overlapping portions, though not as large as one pixel, have great effects on the dot coverage over blank areas and therefore the image grayscale level. That is, if the shift between different planes changes due to variations in the distance between the print medium and the ejection opening face (paper-print head distance) and variations in print medium conveyed distance, a uniform grayscale level of an image also changes, resulting in grayscale variations or density unevenness emerging in the printed image.

Therefore, as higher and higher quality is being demanded of printed images in recent years, there is a growing need for a print data distribution method used in multipass printing that can deal with possible registration shifts between different planes caused by variations in many printing conditions. An ability to tolerate grayscale variations and density unevenness in printed images resulting from registration shifts between different planes, no matter what printing condition variations have caused the registration shifts, is referred to as a "robustness" in this patent application.

Japanese Patent Laid-Open No. 2000-103088 discloses a method of distributing print data to enhance the robustness. This patent document focuses its attention on the fact that image grayscale variations resulting from variations in many printing conditions are caused by the distributed pieces of binary print data being in a complete complementary relationship with each other. The patent document discloses a technique which, in an attempt to reduce such a complementary relationship to prevent large grayscale variations from occurring when there are shifts among a plurality of planes, involves distributing the image data corresponding to individual pixels in the form of multivalued data before being binarized and then individually binarizing the distributed multivalued data.

FIG. 4 is a block diagram showing an example of control configuration that realizes the data distribution as disclosed in Japanese Patent Laid-Open No. 2000-103088. The patent document describes as an example a printing apparatus that distributes print data to two print heads. Multivalued image data from a host computer 2001, after being subjected to a variety of image processing, is distributed to a first data conversion unit 2008 and a second data conversion unit 2009 according to a predetermined distribution ratio by a multivalued SMS unit 2007. Each of the data conversion units performs a conversion operation on the data according to the specified distribution coefficient, with the converted multivalued data transferred to a first binarization unit 2010 and a second binarization unit 2011. The first binarization unit 2010 and the second binarization unit 2011 each perform the binarization based on an error diffusion method using an error matrix and a threshold. The binarized image data are stored in a first band memory 2012 and a second band memory 2013. Then, in a predetermined printing scan the associated print heads eject ink according to the binary data stored in the respective band memories.

FIG. 5 shows an array of dots printed on a print medium according to Japanese Patent Laid-Open No. 2000-103088. In the figure, black dots 21 are those printed by a first print head, white dots 22 are those printed by a second print head and hatched dots 23 are those printed overlappingly by the first print head and the second print head. Unlike FIG. 3 that has a complete complementary relationship between the dots printed by the first print head and the dots printed by the second print head, this example has no such complementary relationship, so in some areas two dots overlap and in other areas or blank areas not a single dot is formed.

Here, let us consider a case where a plane printed by the first print head and a plane printed by the second print head are shifted by a distance of one pixel either in the main scan direction or in the subscan direction. In that case, while areas printed overlappingly by the first print head and the second print head increase, there also occur areas where the two dots already printed overlappingly come apart. So, when a certain expanse of area is considered, the dot coverage over a white print medium has not changed much, nor has a change occurred in an image grayscale level. That is, the method proposed by Japanese Patent Laid-Open No. 2000-103088 can suppress grayscale level variations and occurrence of density unevenness even if the distance between the print medium and the print head ejection face (paper-print head distance) changes or if the print medium conveyed distance changes.

Further, Japanese Patent Laid-Open No. 2006-231736 discloses a technique which, while distributing the image data in a multivalued state among a plurality of printing scans or printing element arrays as Japanese Patent Laid-Open No. 2000-103088 does, changes the distribution ratio of the image data according to the position of pixel of interest. In this patent document, the effects of suppressing banding and color variations that would occur during a multipass printing are described to be able to be produced by changing the distribution ratio according to the pixel positions in the main scan direction, linearly, cyclically, sinusoidally or based on a combination of high and low frequency waves.

However, studies conducted by the inventors of this invention have found that, even if it employs the methods of Japanese Patent Laid-Open No. 2000-103088 and 2006-231736, the printing system that distributes the image data among a plurality of planes before printing leaves image impairments in an output image. The image impairments produced will be described in detail as follows. In the methods of Japanese Patent Laid-Open No. 2000-103088 and 2006-231736, the binarization operations in individual planes are performed independently, with no correlation provided between them. More specifically, for example, the decision of whether a dot should be or should not be printed in a pixel of interest on a certain plane does not consider or use information on a pixel that lies at the same position in other planes.

In such circumstances, if deviations occur between different planes after the binarization operations have been performed, the low frequency component of dots arrangement on individual planes may become emphasized, showing its characteristic pattern (texture), which in turn may be recognized as graininess, or unwanted image impairments. That is, the methods of Japanese Patent Laid-Open Nos. 2000-103088 and 2006-231736, while they can suppress grayscale variations caused by shifts between different planes, cannot eliminate the image impairment that is visually recognized as graininess, failing to provide enough robustness.

SUMMARY OF THE INVENTION

The present invention has been accomplished to resolve the above problem. It is therefore an object of this invention to provide an image processing apparatus and an image processing method which, when uniformity and smoothness of image are given priority, can produce an image with excellent robustness not only against grayscale variations but also against graininess.

The first aspect of the present invention is an image processing apparatus which performs a plurality of printing scans of a print head over a unit area of a print medium to form an image on the unit area, comprising: an input unit which receives image data represented as multiple bits for each pixels in the unit area; an data generation unit which generates image data corresponding to each of the printing scans from the received image data for the unit area; a convert unit which converts the image data generated by the data generation unit into print data represented as number of bits less than the multiple bits, and an unit to execute the printing scan over the unit area according to the print data converted by the convert unit; wherein the data generation unit having: an information generation unit which generates an information for each of pixel from the print data using predetermined coefficient; a memory which stores the information; a upload unit which uploads the information stored in the memory unit every time the print data corresponding to the printing scan is generated, and a modifying unit which modifies the image data according to the information stored in the memory unit.

The second aspect of the present invention is an image processing apparatus, that uses a first printing element array and a second printing element array both ejecting the same kind of ink and which performs a plurality of printing scans over a unit area of a print medium to form an image on the unit area, comprising: a data storage unit which stores multivalued image data corresponding to the unit area; an information storage unit which stores print volume information; a distribution unit which distributes, based on print volume information stored in the information storage unit, the multivalued image data for a Kth printing scan over the unit area to a first plane for the first printing element array and a second plane for the second printing element array; a conversion unit which converts the multivalued image data distributed to the planes by the distribution unit into binary print data; an unit to execute the Kth printing scan over the unit area according to the print data by activating the first printing element array and the second printing element array in that order; and a generation unit which, after the binary print data are generated by the conversion unit, updates the print volume information on the unit area according to the generated print data and store the updated print volume information in the information storage unit; wherein the distribution unit distributes the multivalued image data to the first plane according to the print volume information for up to (K−1)th printing scan and distributes the multivalued image data to the second plane according to the print volume information updated after the grayscale level reduction unit has generated the binary print data for the first plane.

The third aspect of the present invention is an image processing apparatus, that uses a first printing element array and a second printing element array both ejecting the same kind of ink and which performs a plurality of printing scans over a unit area of a print medium to form an image on the unit area, comprising: a data storage unit which stores multivalued image data corresponding to the unit area; a first information storage unit which stores print volume information; a second information storage unit which stores print volume information; a first distribution unit which distributes, based on print volume information stored in a first information storage unit, the multivalued image data for a Kth printing scan over the unit area to a first plane for the first printing element array; a second distribution unit which distributes, based on print volume information stored in the second information storage unit, the multivalued image data for a Kth printing scan over the unit area to a second plane for the second printing element array; a first conversion unit which converts the multivalued image data distributed to the first plane by the first distribution unit into binary print data; a second conversion unit which converts the multivalued image data distributed to the second plane by the second distribution unit into binary print data; an unit which executes the Kth printing scan over the unit area according to the print data by activating the first printing element array and the second printing element array in that order; a first information generation unit which, after the binary print data is generated by the first conversion unit, updates the print volume information on the unit area according to the generated print data and store the updated print volume information in the second information storage unit; and a second information generation unit which, after the binary print data is generated by the second conversion unit, updates the print volume information on the unit area according to the generated print data and store the updated print volume information in the first information storage unit.

The fourth aspect of the present invention is an image processing method which performs a plurality of printing scans of a print head over a unit area of a print medium to form an image on the unit area, comprising: an input step to receive image data represented as multiple bits for each pixels in the unit area; a data generation step to generate image data corresponding to each of the printing scans from the received image data for the unit area; a conversion step to convert the image data generated by the data generation step into print data represented as number of bits less than the multiple bits, and a step to execute the printing scan over the unit area according to the print data converted by the conversion step; wherein the data generation step including: an information generation step to generate an information for each of pixel from the print data using predetermined coefficient; a storage step to stores the information in a memory; a upload step to upload the information stored in the memory every time the print data corresponding to the printing scan is generated, and a modifying step to modify the image data according to the information stored in the memory.

The fifth aspect of the present invention is an image processing method, that uses a first printing element array and a second printing element array both ejecting the same kind of ink and which performs a plurality of printing scans over a unit area of a print medium to form an image on the unit area, comprising: a data storage step to store multivalued image data corresponding to the unit area; a distribution step to distribute, based on print volume information stored in a print volume information storage unit, the multivalued image data for a Kth printing scan over the unit area to a first plane for the first printing element array and a second plane for the second printing element array; a conversion step to convert the multivalued image data distributed to the planes by the distribution step into binary print data; a step to execute the Kth printing scan over the unit area according to the print data by activating the first printing element array and the second printing element array in that order; and a generation step to, after the print data is generated by the conversion step, update the print volume information on the unit area according to the generated print data and store the updated print volume information in the print volume storage unit; wherein the distribution step distributes the multivalued image data to the first plane according to the print volume information for up to (K−1)th printing scan and distributes the multivalued image data to the second plane according to the print volume information updated after the conversion step has generated the binary print data for the first plane.

The sixth aspect of the present invention is an image processing method, that uses a first printing element array and a second printing element array both ejecting the same kind of ink and which performs a plurality of printing scans over a unit area of a print medium to form an image on the unit area, comprising: a data storage step to store multivalued image data corresponding to the unit area; a first distribution step to distribute, based on print volume information stored in a first print volume storage unit, the multivalued image data for a Kth printing scan over the unit area to a first plane for the first printing element array; a second distribution step to distribute, based on print volume information stored in a second print volume information storage unit, the multivalued image data for a Kth printing scan over the unit area to a second plane for the second printing element array; a first conversion step to convert the multivalued image data distributed to the first plane by the first distribution step into binary print data; a second conversion step to convert the multivalued image data distributed to the second plane by the second distribution step into binary print data; a step to execute the Kth printing scan over the unit area according to the print data by activating the first printing element array and the second printing element array in that order; a first information generation step to, after the binary print data is generated by the first grayscale level reduction step, update the print volume information on the unit area according to the generated print data and store the updated print volume information in the second print volume storage unit; and a second information generation step to, after the binary print data is generated by the second conversion step, update the print volume information on the unit area according to the generated print data and store the updated print volume information in the first print volume storage unit.

Further features of the present invention will become apparent from the following description of exemplary embodiments (with reference to the attached drawings).

BRIEF DESCRIPTION OF THE DRAWINGS

FIGS. 9A and 9B show a coefficient that a print volume information generation unit uses in performing a filter calculation on first plane binary data output from a grayscale level reduction unit, and a result of the filter calculation;

DESCRIPTION OF THE EMBODIMENTS

Now, embodiments of the present invention will be explained by referring to the accompanying drawings. Although the embodiments explained in the following take up an ink jet printing apparatus as an example, this invention can also be effectively applied to other apparatus as long as they form an image by activating a plurality of printing elements according to a dot alignment method.

(First Embodiment)

Figure 1:
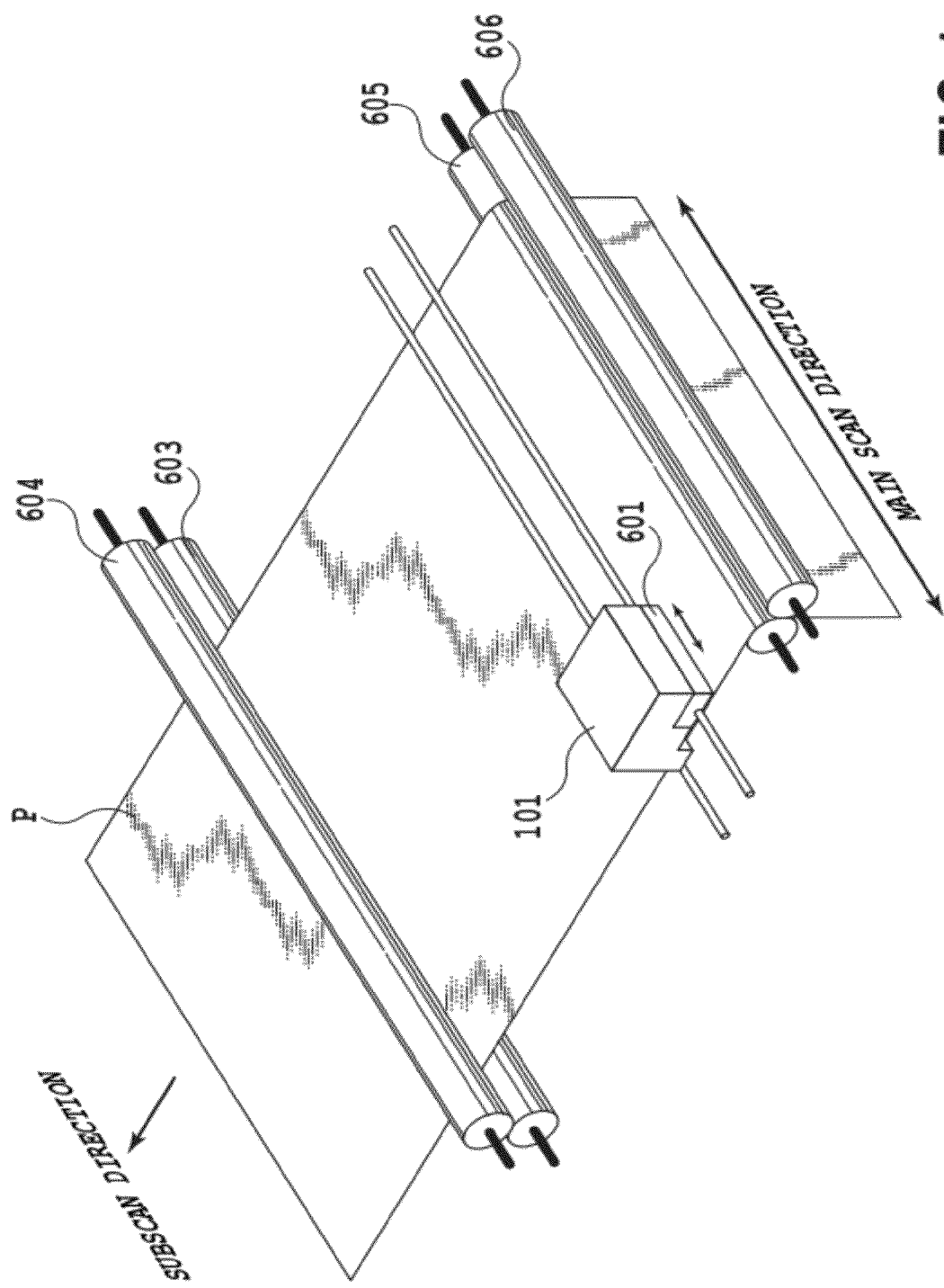
FIG. 1 is a schematic diagram showing an internal construction of a serial type ink jet printing apparatus used in this embodiment.
Figure 2:
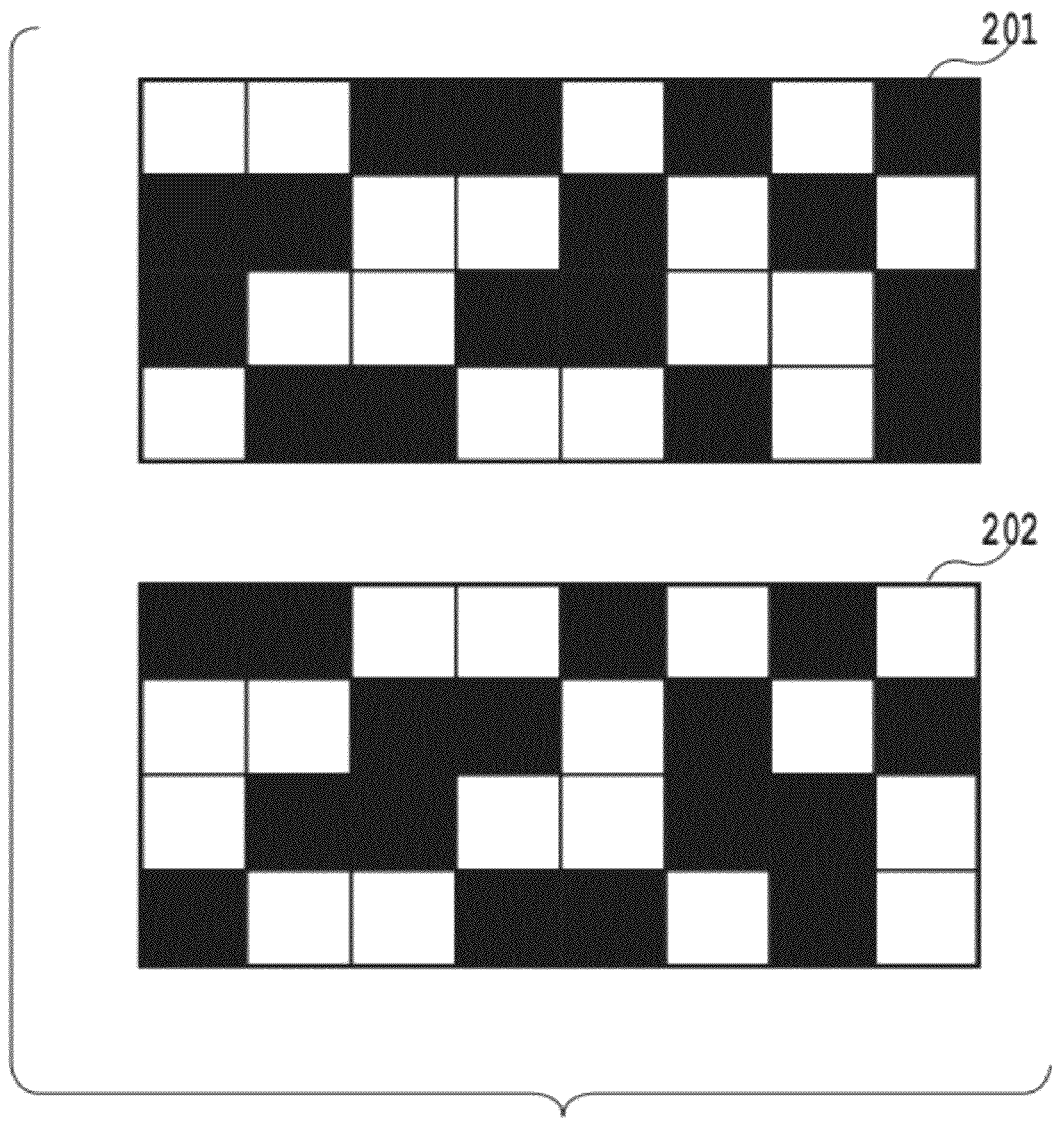
FIG. 2 is a schematic diagram showing an example mask pattern that may be used in a 2-pass printing.
Figure 3:
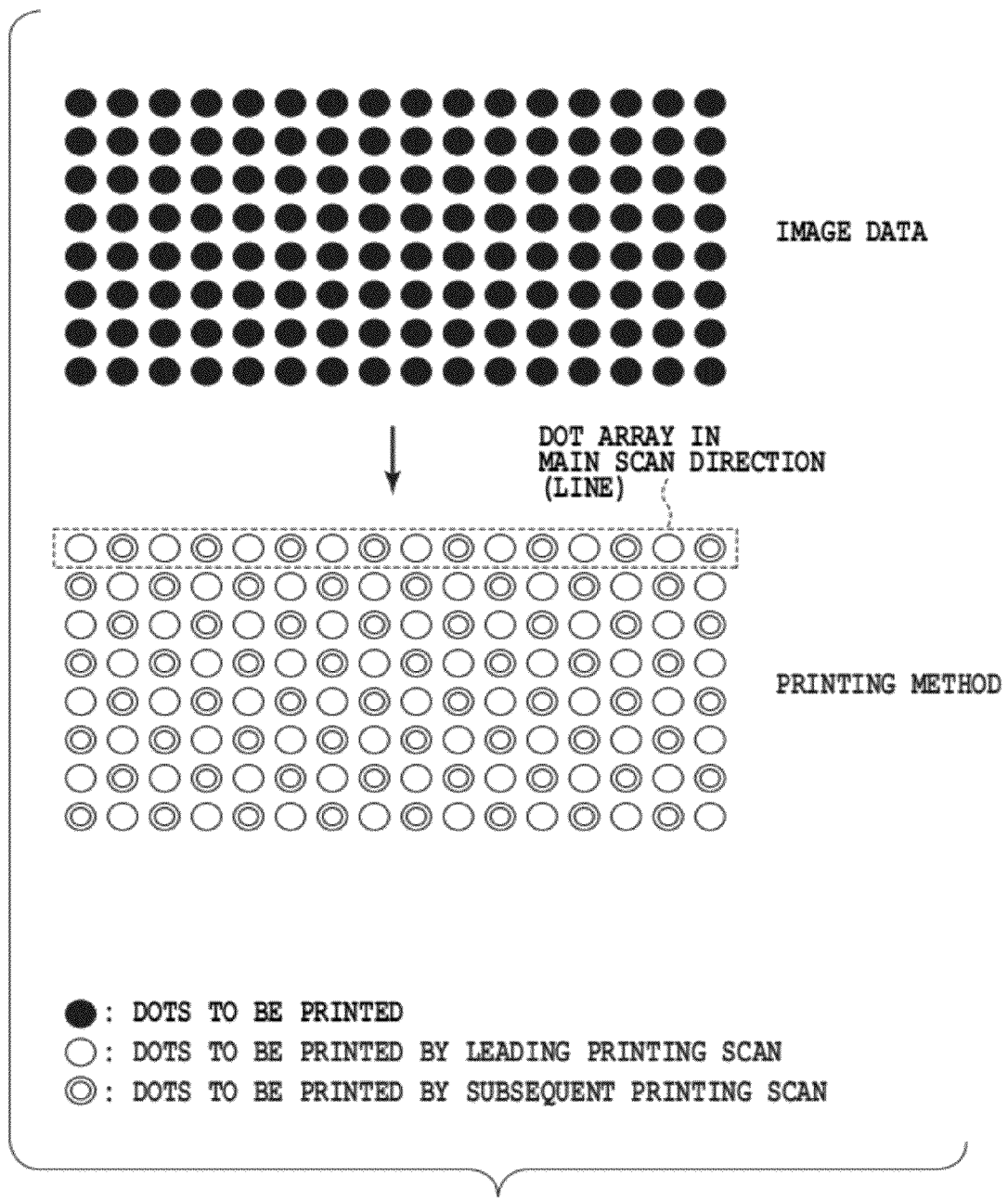
FIG. 3 shows an example array of pixels to be printed (print pixels) in binary image data and a result of distributing these print pixels to two printing scans according to the method of Japanese Patent Laid-Open No. 6-191041.
Figure 4:
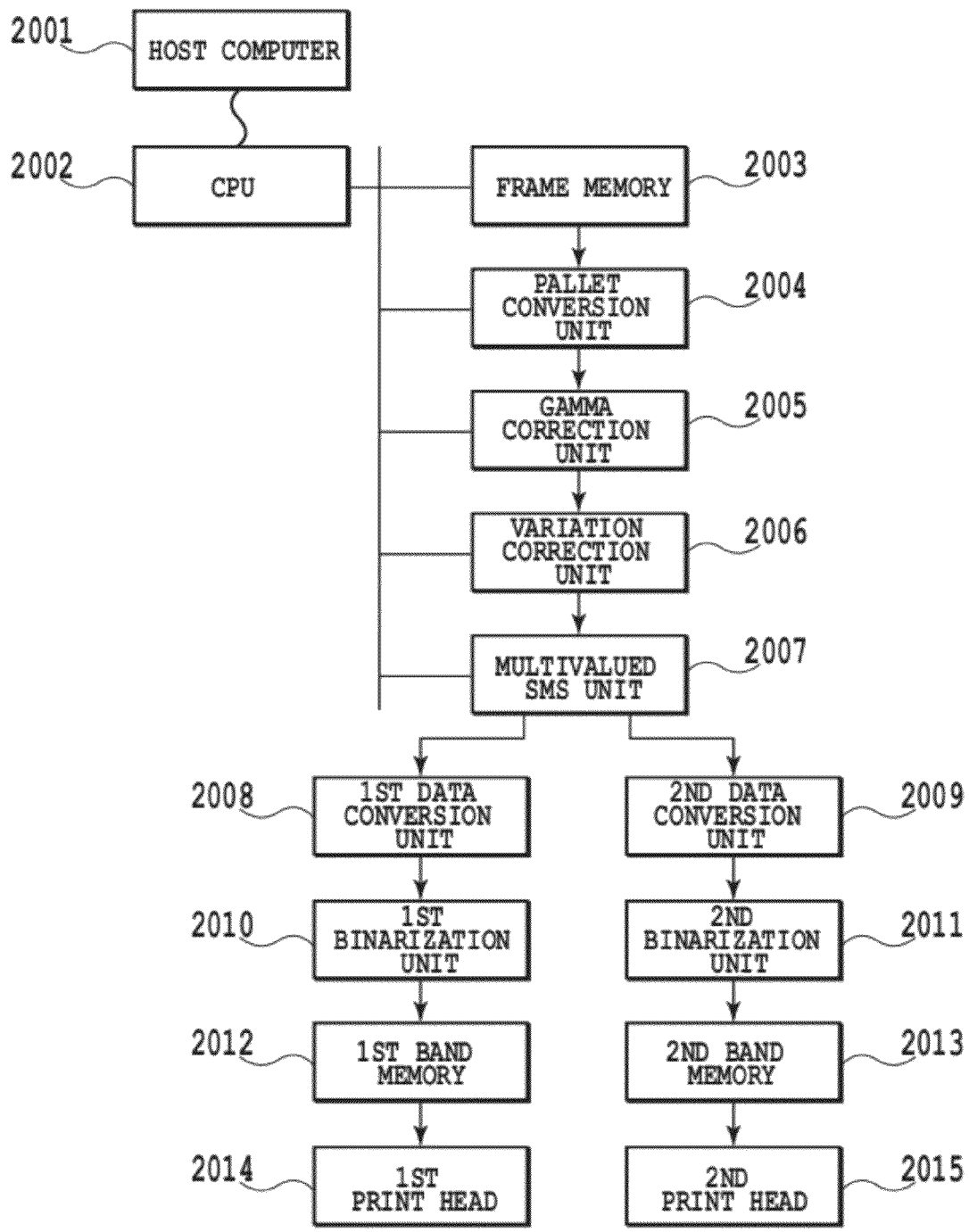
FIG. 4 is a block diagram showing an example control configuration that realize the data distribution described in Japanese Patent Laid-Open No. 2000-103088.
Figure 5:
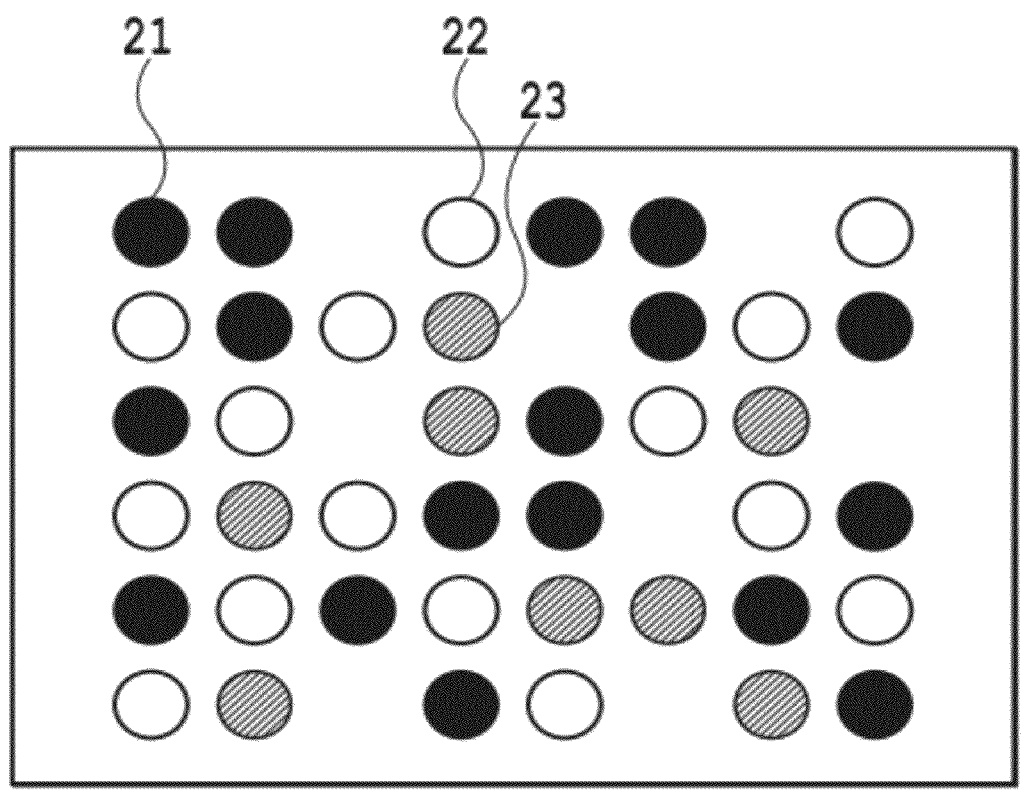
FIG. 5 illustrates an array of dots printed on a print medium according to the method of Japanese Patent Laid-Open No. 2000-103088.

FIG. 1 schematically shows an internal construction of a serial type ink jet printing apparatus used in this embodiment. A print head 101 designed to eject a plurality of color inks is mounted on a carriage 601 reciprocally traveling at a constant speed in the main scan direction, and ejects ink in the form of droplets at a frequency that matches the constant travel speed. When one printing scan finishes, a conveying roller 604 and an auxiliary roller 603 rotate, conveying a print medium P held between the paired rollers and between a supply roller 605 and an auxiliary roller 606 in the subscan direction by a distance corresponding to a print width of a print head 101. By repetitively alternating the printing scan and the print medium conveying operation, an image is printed progressively on the print medium P.

Figure 6:
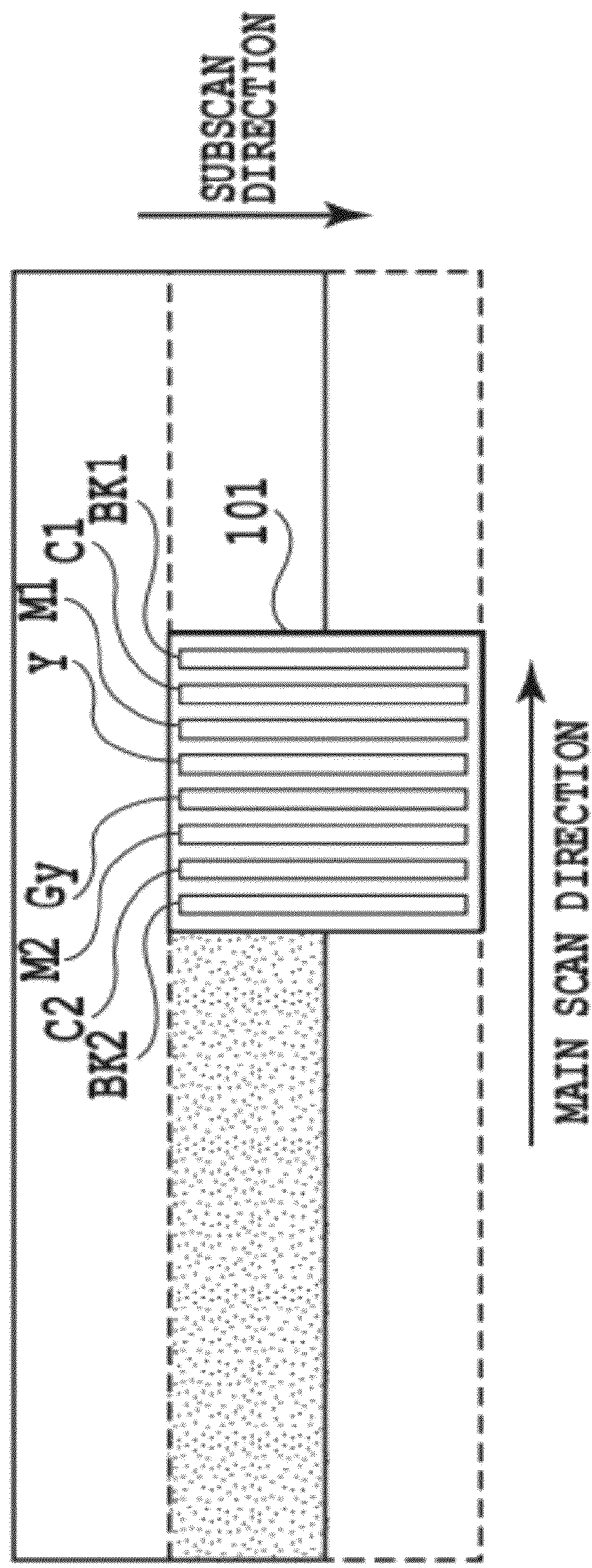
FIG. 6 shows a more detailed construction of the print head used in the embodiment of the present invention.

FIG. 6 shows a detailed construction of the print head 101 used in this embodiment. The print head 101 of this embodiment comprises eight print heads (printing element arrays) that eject ink droplets of different colors. Of these, two heads—Bk1 and Bk2—are used for a black ink, two heads—C1 and C2—for a cyan ink, and two heads—M1 and M2—for a magenta ink. For a gray ink and a yellow ink, one head each is provided—a Gy head and a Y head. These heads are arranged side by side in the main scan direction as shown in the figure, with two sets of the black, cyan and magenta heads arranged laterally symmetrical with respect to the center. The print head of each color has a plurality of printing elements arrayed in the subscan direction at a density corresponding to a print resolution.

Here it is assumed that the print head 101 executes an ink ejection operation as it travels from left toward right in the figure. As for the black ink, the same image area on the print medium is printed with the Bk1 head first, followed by the Bk2 head. In this document, a head that prints first on the same image area, like Bk1, is referred to as a leading head. And a head that subsequently prints on the same image area, like Bk2, is referred to as a follower head. This also applies to cyan and magenta ink.

Where the print head 101 performs the ink ejection operation as it moves both from left to right and from right to left, as during a bidirectional printing, the leading head and the follower head are swapped according to the scan direction of the print head.

Arranging laterally symmetrically a plurality of print heads for one color ink, as shown in FIG. 6, leads to an improvement in print speed of the printing apparatus. What has made this improvement possible will be explained in detail.

Generally there is a limit to a frequency at which individual printing elements of the print head can eject ink. To realize a desired print resolution, the speed of the carriage movement is often determined by the upper limit of the ink ejection frequency. Under this condition, if two print heads are used for one ink color, as in this embodiment, each of the two print heads needs only to print two-for-one data. Therefore, the carriage speed can be nearly doubled remaining the ink ejection frequency the same.

In the construction in which two print heads for each color are arranged symmetrical, as in this embodiment, the order of color ink application to the print medium remains the same, whether the printing operation is performed in the forward direction or in the backward direction. That is, the fixed order of color ink application to the print medium is black→cyan→magenta→magenta→cyan→black. Therefore, color banding that is characteristic of the bidirectional printing and caused by a changing order of application of color inks, can be prevented by the print head construction of this embodiment. That is, with the print head of this embodiment, the bidirectional printing can be performed without the fear of possible color banding, while at the same time improving the carriage speed. This in turn allows for faster printing of an image than the printing apparatus of conventional construction.

Figure 7:
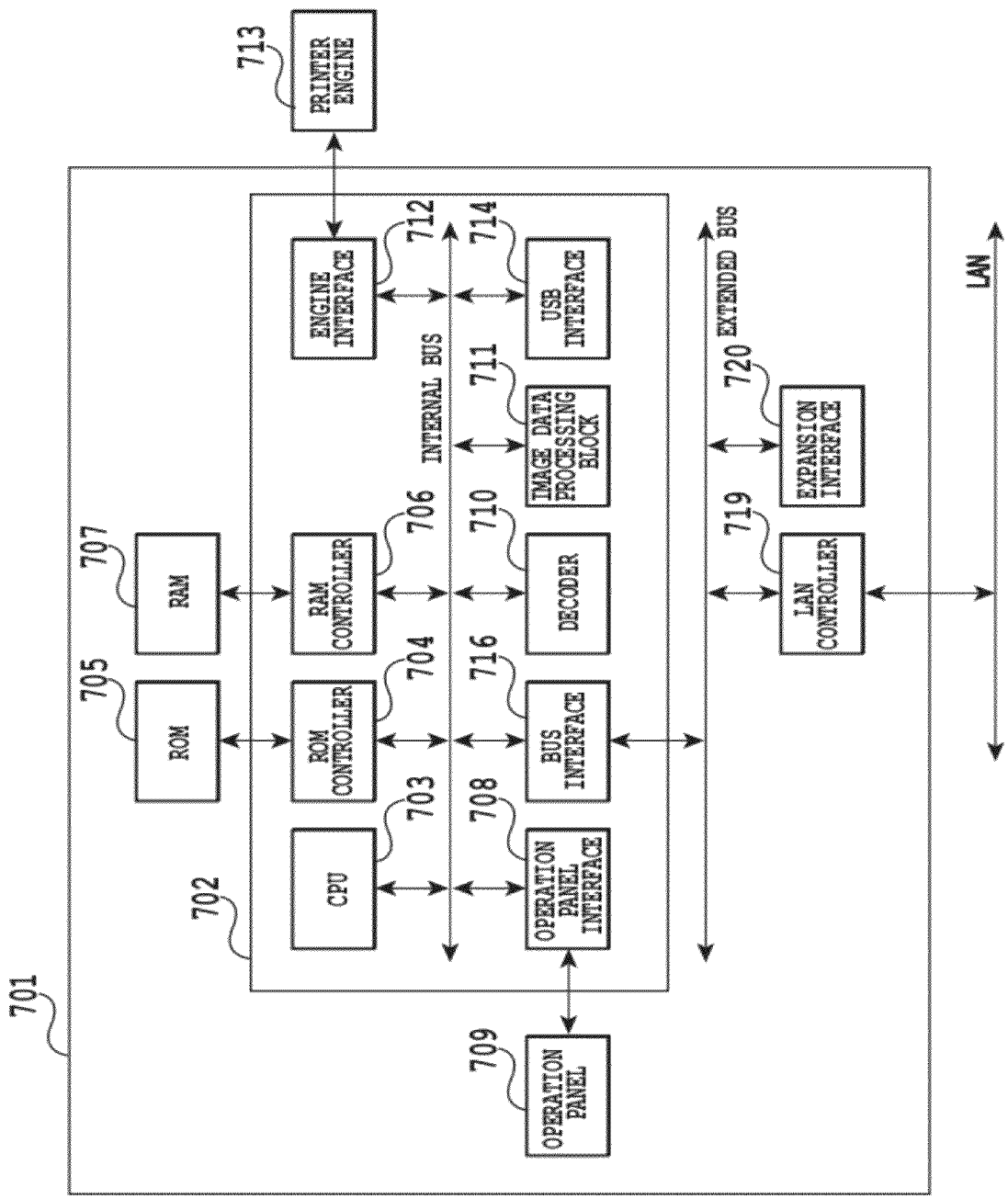
FIG. 7 is a block diagram explaining the control configuration of the printing apparatus according to the first embodiment of the present invention.

FIG. 7 is a block diagram showing a control configuration of the printing apparatus of this embodiment. The printing apparatus comprises mainly a controller 701 and a printer engine 713. The controller 701 has a function to interface with an externally connected host device. The controller 701 interprets image data sent from the host device, performs image processing on the image data and converts it into binary data before transferring it to the printer engine 713. The printer engine 713 receives the binarized print data from the controller 701 and performs a scan control on a carriage 601, an ejection control on the print head 101 and a print medium conveying control, thereby forming an image on the print medium.

The controller 701 can be connected with a plurality of host devices on a network through a LAN controller 719 and an extended interface 720. It can also be connected with another host device through a USB interface 714 to receive image data.

The controller 701 comprises a controller chip 702, ROM 705, RAM 707, operation panel 709, LAN controller 719 and extended interface 720. The controller chip 702 is connected with the LAN controller (input unit) 719 and the extended interface 720 via an extended bus. The controller chip 702 is a so-called SOC (System On a Chip), which has a CPU 703, RON controller 704, RAM controller 706, operation panel interface 708, bus interface 716, decoder 710, image data processing block 711, USB interface 714 and engine interface 712. These blocks are interconnected via an internal bus.

The CPU 703 operates according to a program stored in the ROM 705 to communicate with the host device and the printer engine via interfaces and also perform various controls. The ROM controller 704 interfaces with the connected ROM 705. The RAM controller 706 interfaces with the connected RAM 707 and controls a RAM access timing to transfer data to and from the RAM according to requests from the CPU 703 and other blocks.

The operation panel interface 708 interfaces with the operation panel 709 equipped with operation keys, LEDs and LCDs. It transfers operation key inputs from the user to the CPU 703 and controls the turn-on/off of LEDs and LCDs according to commands from the CPU 703.

The bus interface 716 is a block to control the extended bus. It controls a communication with the controllers connected to the extended bus. The decoder 710 reads from the RAM 707 the compressed, coded print data sent from the host PC and decodes them before writing them back to the RAM. The image data processing block 711 reads from the RAM 707 the data decoded by the decoder, converts them into dot data for each ink color and writes the dot data back to the RAM 707.

The engine interface 712 reads dot data for each ink color from the RAM 707 and send them to the printer engine 713.

The print data sent from the host device is entered through the interfaces of the controller. The image data entered through the LAN controller is transferred via the extended bus and through the bus interface 716 of the controller chip 702 and then written into the RAM 707 according to the control by the RAM controller 706.

The image data written into the RAM 707, after its communication protocol is interpreted by the CPU 703, is transferred to the decoder 710 where it is decoded. The decoded image data is converted into dot data for each ink color by the image data processing block 711 and then transferred through the engine interface 712 to the printer engine 713 that prints the dot data on the print medium.

Figure 8:
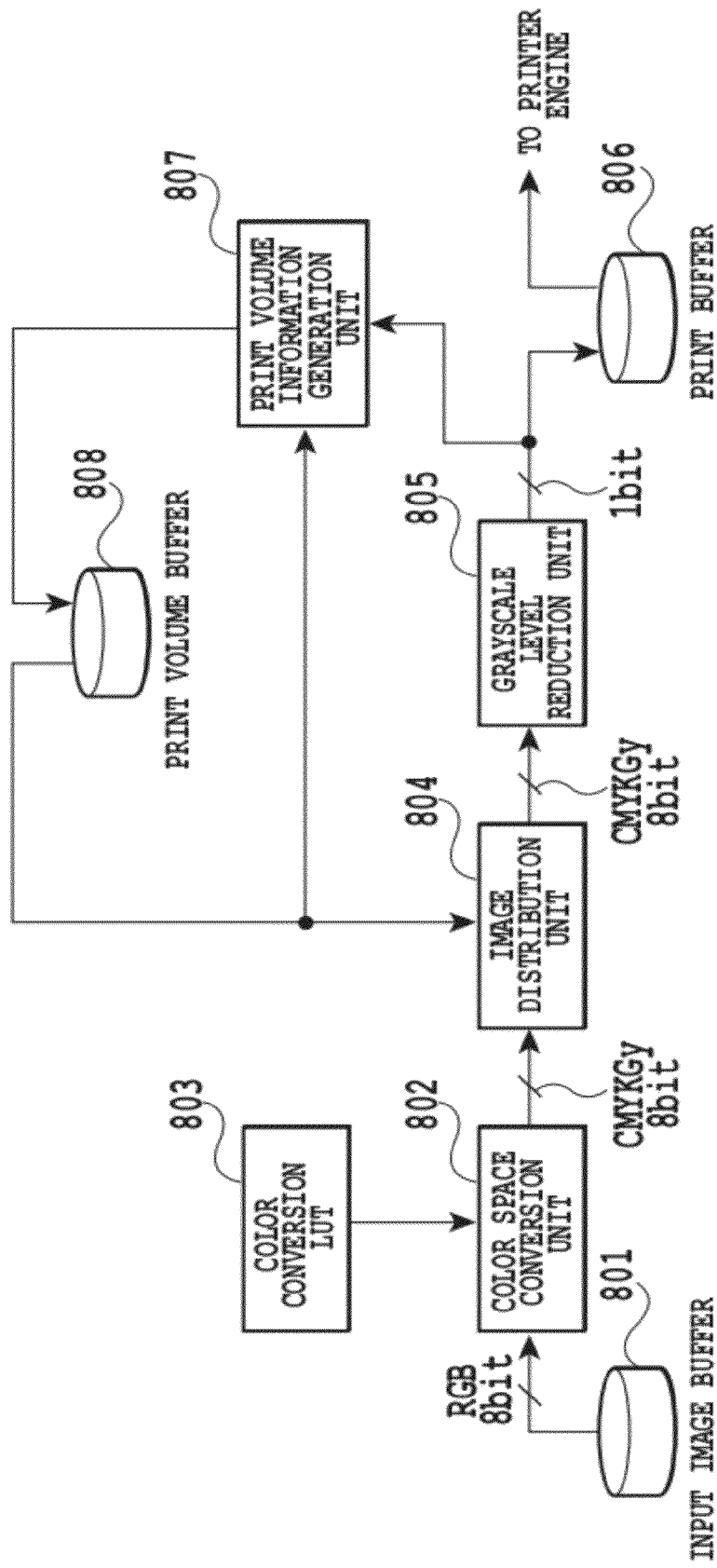
FIG. 8 is a block diagram explaining the construction within an image data processing block 711 of FIG. 7, connections of various buffers and image processing performed by the block.

FIG. 8 is a block diagram showing the construction within the image data processing block 711 of FIG. 7, connections of various buffers and image processing performed by the block. The buffers are provided in the RAM 707 of FIG. 7. Here, an example case of a 2-pass printing by one print head will be explained. In the 2-pass printing, after each print scans, the print medium is conveyed for distance corresponding to a half of the print width of the print head.

The image data received from the host device is stored in an input image buffer 801 (data storage unit). The image data at this time is multivalued brightness data (R, G, B) for each pixel represented by 8-bit 256 levels. An image data reading unit not shown reads the input image data from the input image buffer 801 and sends it to a color space conversion unit 802. A read start position in the input image buffer 801 can be specified by setting a desired value in a register incorporated in the image data reading unit.

The color space conversion unit 802 converts the multivalued image data from the RGB color space into multivalued (8-bit 256-level) grayscale data that corresponds to a color space of CMYBK and Gy ink colors used by the printing apparatus. The grayscale data conversion refers to a color conversion lookup table (LUT) 803. In the following how the image processing is performed on the multivalued grayscale data for one print head (e.g., Y head) will be explained.

An image distribution unit 804 distributes the multivalued grayscale data of an unit area produced by the color space conversion unit 802 for a first printing scan over the print medium. The unit area is a minimum image unit that is completed by a plurality of same printing scans. A plane storing the image data that is to be printed in the first printing scan is defined to be a first plane; and a plane storing the image data that is to be printed in the second printing scan is defined to be a second plane.

In distributing the image data to the first plane, the image distribution unit 804 may distribute the multivalued image data evenly among the two planes. It is also possible to change a distribution ratio between the two planes according to the position of pixel being processed as Japanese Patent Laid-Open No. 2006-231736.

The distributed multivalued image data is subjected to a grayscale level reduction operation in each plane by a grayscale level reduction unit (conversion unit) 805. The grayscale level reduction operation may employ a commonly used error diffusion method or a dither matrix method. In the grayscale level reduction operations that are performed parallelly in two planes, however, it is desired that some considerations be taken, such as, in an error diffusion method, differentiating thresholds or matrices of scatter coefficients, to prevent the two grayscale level reduction operations from producing the same results. Following process is described for a case in which binary data is generated by the grayscale level reduction operation.

Although the following example produces binary data, it is noted that the grayscale data generated are not limited to binary data. For example, the grayscale data may be 3-level data or 4-level data and any grayscale data with a relatively smaller number of grayscale levels can be applied to this invention.

The binary data thus produced is transferred to a print buffer 806 where, when accumulated in volume for one printing scan, the data is sent to the printer engine 713. Then, the print head 101 performs the printing operation according to the binary data stored in the print buffer 806. The result produced by the first plane grayscale level reduction unit 805 is also transferred to a print volume information generation unit 807.

FIGS. 9A and 9B show a coefficient that the print volume information generation unit 807 uses in performing a filter calculation on first plane binary data output from a grayscale level reduction unit 805, and a result of the filter calculation. A pixel shown hatched is a pixel of interest that is to be processed by the grayscale level reduction unit 805. The print volume information generation unit 807 allocates the result of binarization among neighboring pixels based on the coefficient of FIG. 9A. That is, if the output of the grayscale level reduction unit 805 is 1 (print), this value is first converted into a multivalue (255), which is then allocated according to the coefficient of FIG. 9A. FIG. 9B shows a result obtained after such an allocation has been performed. The print volume information generation unit 807 stores the calculated result in a print volume buffer 808 (print volume information storage unit).

Figure 10:
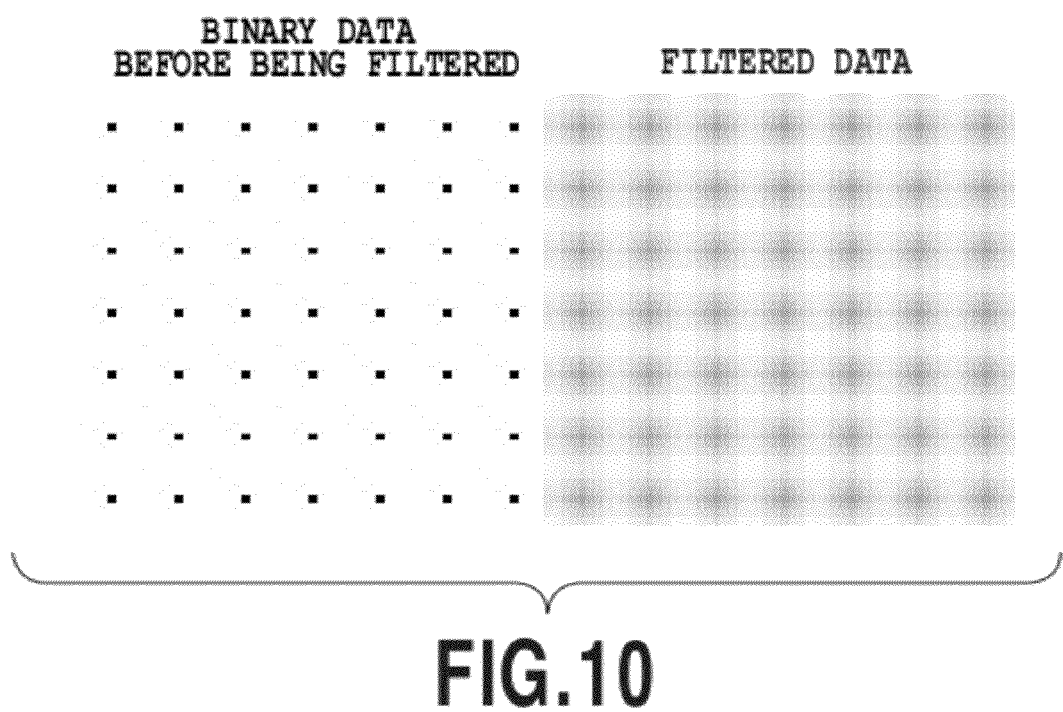
FIG. 10 is an imagery view showing the output result from the grayscale level reduction unit 805 and the result of the above filter operation on the output.

FIG. 10 is an imagery view showing the output result from the grayscale level reduction unit 805 and the result of the above filter operation. The print volume information generation unit 807 adds the allocation value thus obtained to the preceding print volume information read from the print volume buffer 808 to newly create print volume information and then stores it in the print volume buffer 808. In the case of the first plane, i.e., the first printing scan, the data stored in the print volume buffer at this stage is null.

For the processing of the second plane, the image data reading unit again reads input image data from the input image buffer 801 and sends it to the color space conversion unit 802. At this time the data read start position in the input image buffer 801 is shifted ½ the print width of the print head from the position for the first plane. The unit area of interest from which to read data, however, is the same as that of the first plane. Then, as with the processing on the first plane, the color space conversion unit 802 converts the data into multivalued data that matches an associated ink color.

In distributing the second plane image data, the image distribution unit 804 reads the print volume information from the print volume buffer 808. At this stage, the print volume buffer 808 contains the print volume information on the first plane print data. The image distribution unit 804 converts this data into a negative value, adds it to the multivalued data of the second plane and sends the addition result as multivalued image data for the second plane to the grayscale level reduction unit 805. The grayscale level reduction unit 805 then performs the binarization operation in the same way as it was done for the first plane and transfers the binary data obtained to the print buffer 806. Since this example is a 2-pass printing, the second plane binarization result produced by the grayscale level reduction unit 805 is not transferred to the print volume information generation unit 807.

In the above second plane binarization operation, the second plane data value at a pixel that was determined to be printed (1) in the first plane becomes smaller than the original value, so the probability of the pixel of interest and the neighboring pixels being determined to be printed (1) by the binarization operation decreases. As a result, in those areas on the print medium that are printed by the first plane (first printing scan) and the second plane (second printing scan), a percentage of pixels where two dots are printed overlappingly is kept lower than those of Japanese Patent Laid-Open No. 2000-103088. Further, the dot arrangement obtained when the first plane and the second plane are overlapped has an improved dispersion over a conventional case where the binarization operation is performed without providing a correlation between individual planes. This prevents low frequency components of dot arrangements on individual planes from being emphasized or peculiar textures from showing, thus maintaining an excellent uniformity in printed images, no matter in which direction these two planes shift from each other.

Although we have taken for example a 2-pass printing, this embodiment can also form images with a greater number of passes (M passes). In that case, the image distribution unit 804 distributes the received multivalued image data to M planes (1st to Mth plane). Then, the print volume information generation unit 807 accumulates the filtered results for the first to (M−1)th plane successively at a predetermined pixel position in the print volume buffer 808. Suppose F(K) stands for the print volume information that the image distribution unit 804 reads from the print volume information buffer 808 in executing a Kth pass. Then F(K) can be expressed as follows using a function f and an integer K: F(K)=f (1+ 2+ . . . +(K−1)). The image distribution unit 804 converts F(K) into a negative value, adds the converted negative value to the multivalued data before being binarized that was distributed to the plane of interest, and then sends the addition result as multivalued image data for a Kth plane to the grayscale level reduction unit 805. Consider, for example, a case of binarizing M planes of data. Those pixels that have already been decided to be printed (1) in one of the preceding planes, i.e., in one of first to (M−1)th plane, become less likely to be printed with a dot in an Mth printing scan. That is, M different binary signals corresponding to the M printing scans are produced so that dots are printed exclusively scattered among all of the first plane (first printing scan) to the Mth plane (Mth printing scan).

In this embodiment, the filter used in the print volume information generation unit 807 has been described to be an isotropic weighted mean filter which, as shown in FIG. 9A, has a 3×3-pixel area with coefficients arranged almost concentrically. It is noted that the filter is not limited to this type. It may be an isotropic filter of a wider square such as 5×5- or 7×7-pixel square. And it may be an anisotropic filter, of a rectangle, such as 5×7- or 5×9-pixel rectangle, with filter coefficients arranged in oval shape. It may also be a low-pass, band-pass or high-pass characteristic filter.

In the above, an example case of performing a 2-pass printing with one print head has been explained. It is, however, noted that, for black, cyan and magenta, there are provided two print heads each and that image data included in the unit area needs to be distributed not only to the associated printing scans or passes but also to the two print heads. In the following we will explain a 2-pass printing method that prints an image by distributing data to the leading head (Bk1 of FIG. 6) and the follower head (Bk2 of FIG. 6).

Since the first plane for the leading head is a data that is printed first on the unit area, the image distribution unit 804 distributes the multivalued image data read from the input image buffer 801 without referring to the print volume information. The print volume information generation unit 807 performs the similar processing to that described above on the first plane binary data for the leading head output from the grayscale level reduction unit 805 and then stores the processed data in the print volume buffer 808.

The first plane image data for the follower head is distributed by using the print volume information already stored in the print volume buffer 808, i.e., the first plane image print volume information for the leading head. More specifically, the image distribution unit 804 reads the print volume information from the print volume buffer 808, converts the retrieved data into a negative value, adds it to the multivalued data distributed to the first plane of the follower head and sends the addition result as the multivalued image data for the first plane of the follower head to the grayscale level reduction unit 805. The print volume information generation unit 807 performs the similar processing to that described above on the first plane binary data for the follower head output from the grayscale level reduction unit 805 and adds the processed binary data to the print volume buffer 808, in which the first plane data for the leading head is already stored, thus updating the buffer.

In the subsequent second printing scan, the image distribution unit 804 distributes the second plane image data for the leading head by using the print volume information already stored in the print volume buffer 808. At this stage, the print volume buffer 808 holds a sum of the first plane print information for the leading head and the first plane print information for the follower head. The image distribution unit 804 reads the print volume information, converts it into a negative value, adds the negative value to the multivalued data distributed to the second plane for the leading head and sends the addition result as the second plane multivalued image data for the leading head to the grayscale level reduction unit 805. The print volume information generation unit 807 performs the similar processing to that described above on the second plane binary data for the leading head output from the grayscale level reduction unit 805. Then, the print volume information generation unit 807 performs the addition operation on the print volume buffer 808 that already contains the sum of the first plane print information for the leading head and the first plane print information for the follower head, thus updating the buffer.

The second plane image data for the follower head is distributed by using the print volume information currently stored in the print volume buffer 808. At this stage the print volume buffer 808 contains a sum of the first plane print information for the leading head, the first plane print information for the follower head and the second plane print information for the leading head. The image distribution unit 804 reads the print volume information, converts it into a negative value and adds the negative value to the multivalued data distributed to the second plane for the follower head, before sending the added result as the second plane multivalued image data for the follower head to the grayscale level reduction unit 805.

A detailed sequence of steps executed when an M-pass printing is performed using the print head of this embodiment will be explained as follows.

Figure 11:
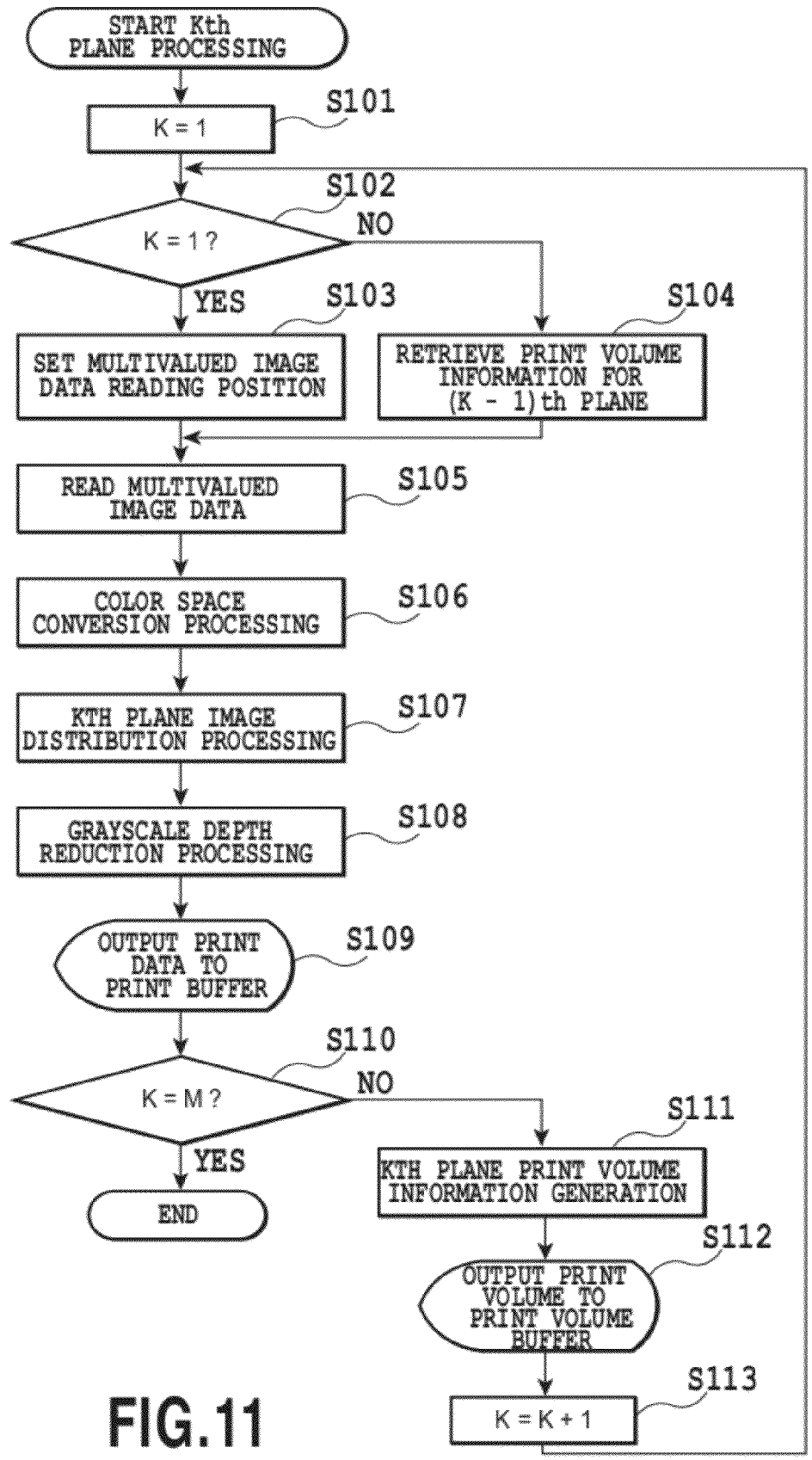
FIG. 11 is a flow chart showing a sequence of steps of image data processing that the image data processing block 711 performs on an arbitrary unit area for Y head or Gy head during an M-pass printing in the first embodiment.

FIG. 11 is a flow chart showing a sequence of steps that the image data processing block 711 executes to perform the image data processing on an arbitrary unit area using the Y head or Gy head during an M-pass printing.

Once this processing is started, step S101 sets a variable K representing number of the pass of intended printing scan to 1.

Step S102 checks if the variable K is K=1. If K≠1, the processing moves to step S104 where it retrieves the print volume information for up to (K−1)th scan that is stored in the print volume buffer 808. Then, the processing jumps to step S105.

When, on the other hand, K is found to be K=1, the processing moves to step S103 where it sets a read start position in the input image buffer 801 from which to start reading multivalued image data contained therein.

Step S105 reads from the read start position in the input image buffer 801 the volume of multivalued image data that matches the unit area. Then, step S106 performs a color space conversion operation on the multivalued image data thus read out. More specifically, the image data processing references a three-dimensional lookup table stored in the ROM 705 to convert 8-bit RGB brightness data into 8-bit CMYBkGy grayscale data.

The next step S107 performs an image distribution operation to derive Kth pass data from the multivalued grayscale data thus obtained. In performing an M-pass printing, the image data assigned to the Kth pass plane is about 1/M the grayscale data obtained in step S106. To this grayscale data is added a negative value of the print volume information obtained by step S104, and the resultant is distributed as Kth pass plane data. If K=1, the print volume information is not retrieved at step S104, in this case, step S107 handles the print volume information as "0".

Step S108 performs the grayscale level reduction operation to binarize the distributed multivalue grayscale data. Here, the binarization may employ an error diffusion method or a dither method as described earlier. In the following description, the data subjected to the grayscale level reduction operation is explained as binary data.

Step S109 outputs the binary data as Kth plane print data to the print buffer 806. The print head 101 performs a Kth printing scan over the unit area of the print medium according to the print data stored in the print buffer 806.

Step S110 checks if K=M. If K≠M, the processing moves to step S111 where it generates Kth plane print volume information from the Kth plane binary data according to the method already explained with reference to FIG. 9, in preparation for a (K+1)th printing scan. In subsequent step S112, the Kth plane print volume information generated by step S111 is added to the existing print volume information for up to (K−1)th plane. Then, the processing moves to step S113 where it increments the variable K, before returning to step S102 for the next printing scan.

If, at step S110, K=M, this means that the current plane is the last plane of the M-pass printing. So, this processing is ended.

Figure 12:
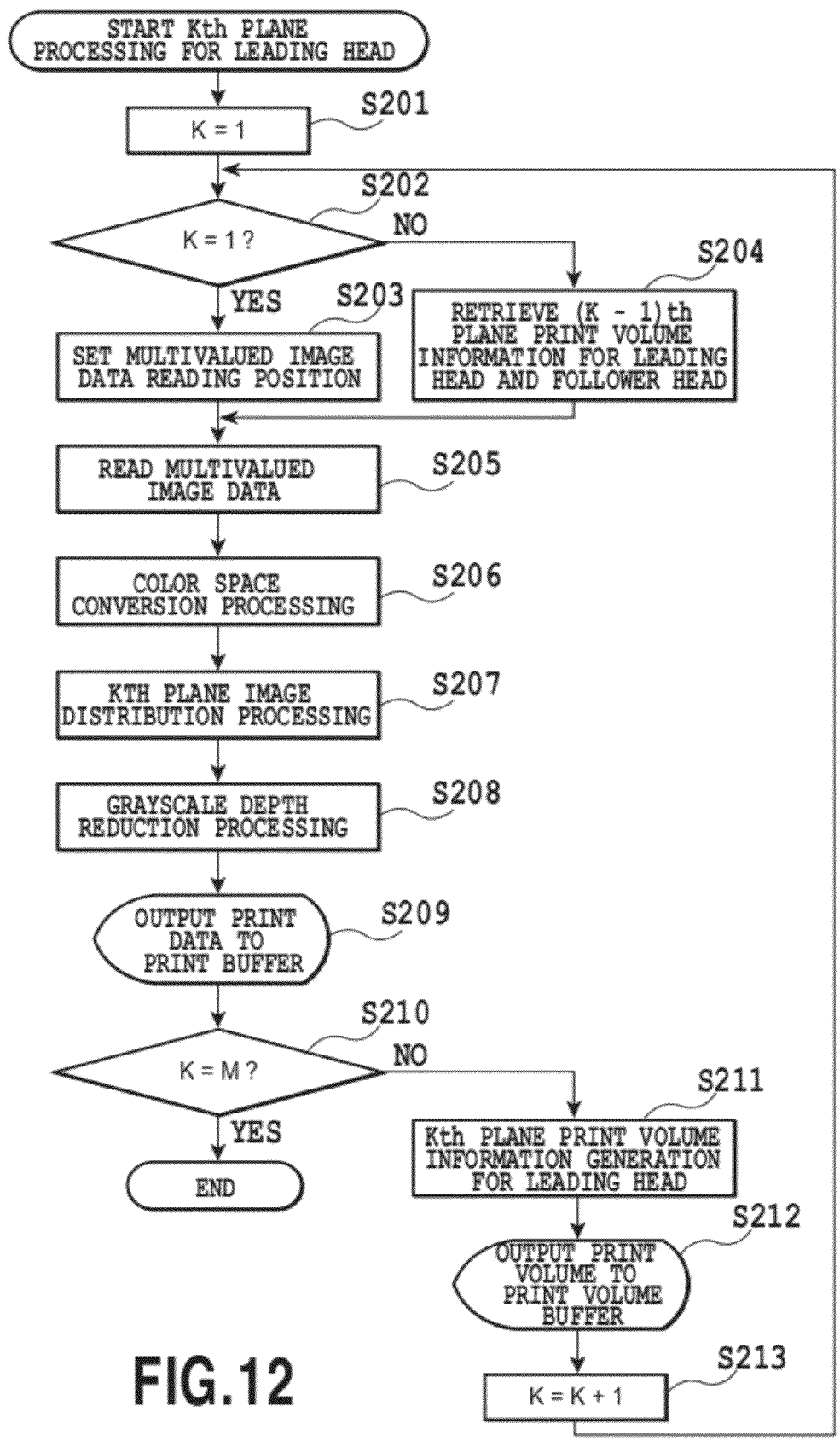
FIG. 12 is a flow chart showing a sequence of steps of image data processing that the image data processing block 711 performs on an arbitrary unit area for Bk1 head, C1 head or M1 head during an M-pass printing in the first embodiment.

FIG. 12 is a flow chart showing a sequence of steps that the image data processing block 711 executes to perform the image data processing on an arbitrary unit area using the leading head (Bk1 head, C1 head or M1 head) during an M-pass printing.

Once this processing is started, step S201 sets a variable K representing number of the pass of intended printing scan to 1.

Step S202 checks if the variable K is K=1. If K≠1, the processing moves to step S204 where it retrieves the print volume information on the leading head and follower head for up to (K−1)th scan that is stored in the print volume buffer 808. Then, the processing jumps to step S205.

When, on the other hand, K is found to be K=1, the processing moves to step S203 where it sets a read start position in the input image buffer 801 from which to start reading multivalued image data contained therein.

The operations of step S205 and step S206 are similar to those of step S105 and step S106 that have been explained with reference to FIG. 11. So, their explanations are omitted here.

The next step S207 performs an image distribution operation to derive Kth pass data for the leading head from the multivalued grayscale data thus obtained. When an M-pass printing is performed using two print heads—the leading head and the follower head—the image data assigned to a Kth plane for the leading head is about 1/(2×M) the grayscale data obtained in step S206. In this embodiment, to this grayscale data is added negative values of the print volume information for the leading head and the follower head obtained in step S204, and the resultant is distributed as Kth plane data for the leading head. If K=1, the print volume information is not retrieved at the step S204, in this case, step S207 handles the print volume information as "0".

Step S208 binarizes the distributed multivalued grayscale data by the similar grayscale level reduction operation to that of step S108 explained with reference to FIG. 11.

Step S209 outputs the binarized image data as Kth plane print data for the leading head to the print buffer 806.

Step S210 checks if K=M. If K≠M, the processing moves to step S211 where it generates Kth plane print volume information for the leading head from the Kth plane binary data for the leading head, in preparation for a (K+1)th printing scan. In the next step S212, the Kth plane print volume information for the leading head generated by step S211 is added to the existing print volume information for the leading head for up to (K−1)th plane. Then, the processing moves to step S213 where it increments the variable K, before returning to step S202 for the next printing scan.

If step S210 finds that K=M, this means that the current plane is the last plane of the M-pass printing. So, this processing is ended.

Figure 13:
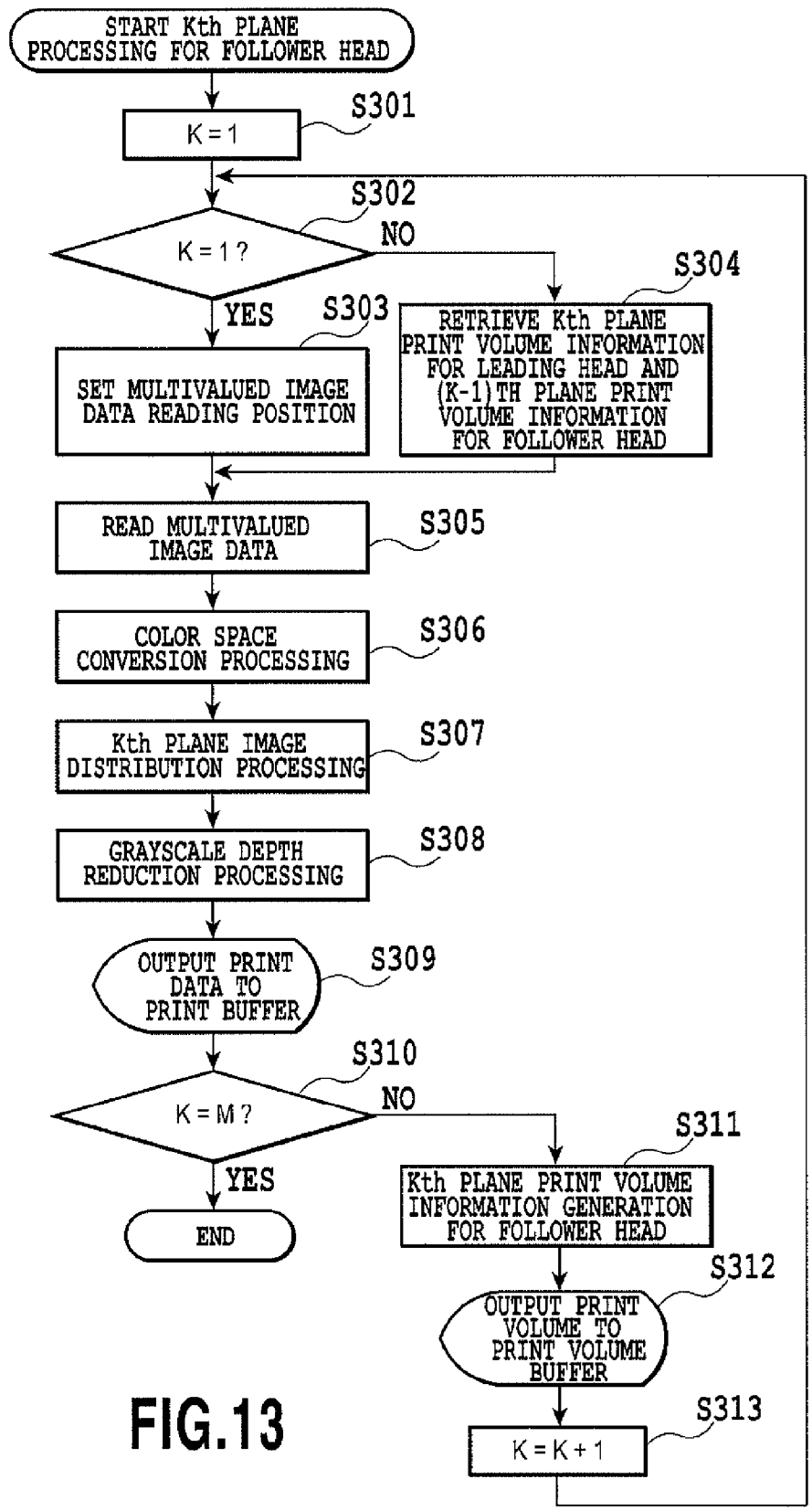
FIG. 13 is a flow chart showing a sequence of steps of image data processing that the image data processing block 711 performs on an arbitrary unit area for Bk2 head, C2 head or M2 head during an M-pass printing in the first embodiment.

FIG. 13 is a flow chart showing a sequence of steps that the image data processing block 711 executes to perform the image data processing on an arbitrary unit area using the follower head (Bk2 head, C2 head or M2 head) during an M-pass printing.

Once this processing is started, step S301 sets a variable K representing number of pass of intended printing scan number to 1.

Step S302 checks if the variable K is K=1. If K≠1, the processing moves to step S304 where it retrieves the print volume information on the leading head for up to Kth scan and the print volume information on the follower head for up to (K−1)th scan that are stored in the print volume buffer 808. Then, the processing jumps to step S305.

When, on the other hand, K is found to be K=1, the processing moves to step S303 where it sets a read start position in the input image buffer 801 from which to start reading multivalued image data contained therein.

The operations of step S305 and step S306 are similar to those of step S105 and step S106 that have been explained with reference to FIG. 11. So, their explanations are omitted here.

The next step S307 performs an image distribution operation to derive Kth pass data for the follower head from the multivalued grayscale data thus obtained. When an M-pass printing is performed using two print heads—the leading head and the follower head—the image data assigned to a Kth plane for the follower head is about 1/(2×M) the grayscale data obtained in step S306. In this embodiment, to this grayscale data is added negative values of the print volume information for the leading head and the follower head obtained in step S304, and the resultant is distributed as Kth plane data for the follower head. If K=1, the print volume information is not retrieved at step S304, in this case, step S307 handles the print volume information as "0".

Step S308 binarizes the distributed multivalued grayscale data by the similar grayscale level reduction operation to that of step S108 explained with reference to FIG. 11.

Step S309 outputs the binarized image data as Kth plane print data for the follower head to the print buffer 806.

Step S310 checks if K=M. If K≠M, the processing moves to step S311 where it generates Kth plane print volume information for the follower head from the Kth plane binary data for the follower head, in preparation for a (K+1)th printing scan. In the next step S312, the Kth plane print volume information for the follower head generated by step S311 is added to the existing print volume information for the follower head for up to (K−1)th plane. Then, the processing moves to step S313 where it increments the variable K, before returning to step S302 for the next printing scan.

If step S310 finds that K=M, this means that the current plane is the last plane of the M-pass printing. So, this processing is ended.

As described above, in the image processing apparatus of this embodiment, the multipass printing of a unit area using a plurality of print heads is done by generating print data for a particular printing scan while at the same time referencing print data of other printing scans or other print heads that print the same unit area. This causes the print data for those printing scans or print heads that print the same unit area to have a correlation among them, which in turn renders excellent a scattering characteristic of dot arrangements on a plurality of planes when overlapped. Therefore, this prevents low frequency components of dot arrangements on individual planes from being emphasized or peculiar textures from showing, thus maintaining an excellent uniformity in printed images, no matter in which direction these two planes shift from each other.

That is, where a plurality of print heads to eject the same color ink are provided in order to increase the printing speed or a multipass printing is employed to improve the image quality, this embodiment can enhance a robustness against graininess, thus producing images with excellent uniformity at high speed.

(Second Embodiment)

In this embodiment, the print volume buffer 808 explained in the first embodiment is divided into two—first print volume storage area (first information storage area) and a second print volume storage area (second information storage area). One of them (the first print volume storage area) is used as a buffer to store print volume information that is generated based on image data for a leading head. An internal construction of a serial type ink jet printing apparatus used in this embodiment and a print head construction are the same as those of the first embodiment explained with reference to FIG. 1 and FIG. 6.

Figure 14:
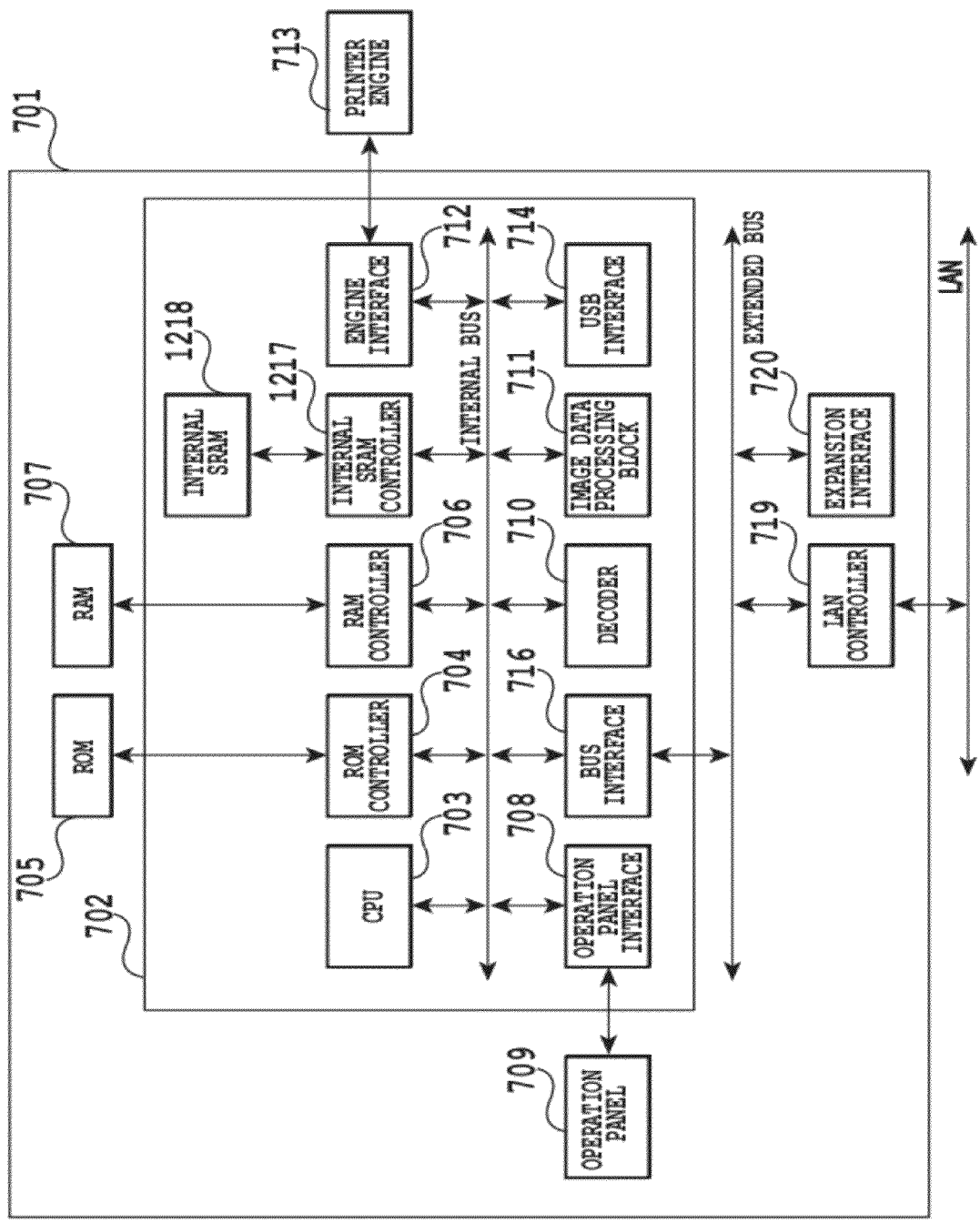
FIG. 14 is a block diagram showing a control configuration for a printing apparatus of the second embodiment.

FIG. 14 is a block diagram showing a control configuration of the printing apparatus of this embodiment. Here, an internal SRAM controller 1217 and an internal SRAM 1218 are added to the controller chip 702 of the first embodiment shown in the block diagram of FIG. 7. The internal SRAM controller 1217 interfaces with the connected internal SRAM 1218 and controls the internal SRAM access timing for input and output of data to and from the internal SRAM 1218 according to requests from the CPU 703 and other blocks.

Figure 15:
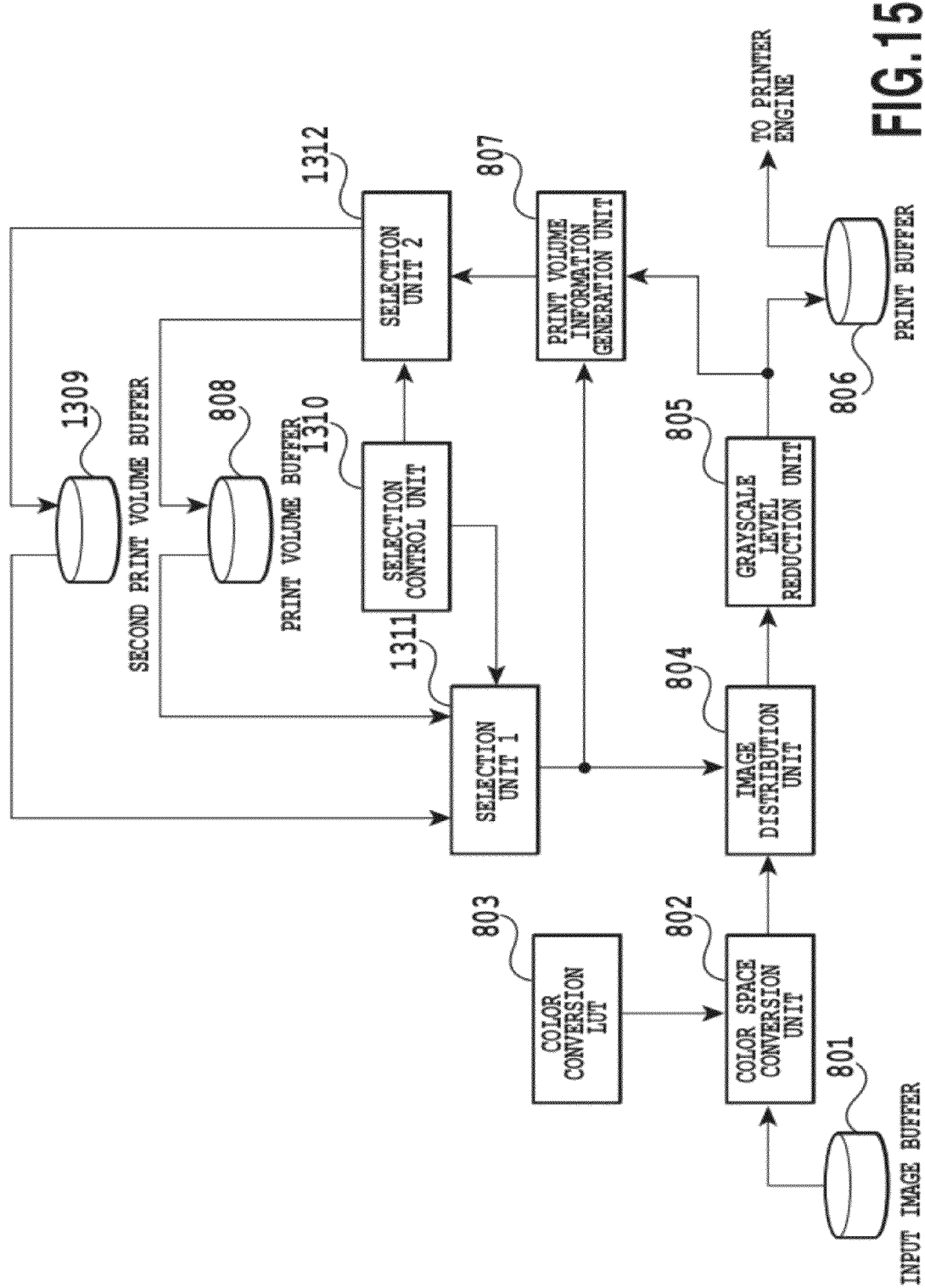
FIG. 15 is a block diagram explaining the construction within an image data processing block 711 of FIG. 14, connections of the block with various buffers and image processing performed by the block.

FIG. 15 is a block diagram explaining the construction within an image data processing block 711 of FIG. 14, connections of the block with various buffers and image processing performed by the block. The input image buffer 801, the print buffer 806 and the print volume buffer 808 are provided in the RAM 707 of FIG. 14. A second print volume buffer 1309 is secured in the internal SRAM 1218. This embodiment has the second print volume buffer 1309, selection unit-1 1311, selection unit-2 1312 and selection control unit 1310 added to the configuration of the first embodiment.

The control performed during the 2-pass printing using one print head is similar to that of the first embodiment. That is, the first plane print volume information is stored in the print volume buffer 808 and the image data to be distributed to the second plane is created based on the information stored in the print volume buffer 808.

In the following, the method of distributing data to a leading head (Bk1 in FIG. 6) and a follower head (Bk2 in FIG. 6) in the same printing scan will be explained.

The first plane for the leading head is the data to be printed first on a unit area. So, the image distribution unit 804 simply distributes the multivalued image data read out from the input image buffer 801 without referencing the print volume information. The print volume information generation unit 807 performs the similar processing to that described above on the first plane binary data for the leading head output from the grayscale level reduction unit 805 and then stores the result in the second print volume buffer 1309. At this time, in which area the data generated by the print volume information generation unit 807 is to be stored is specified by the selection unit-2 1312 according to an instruction from the selection control unit 1310.

The first plane image data for the follower head is distributed using the print volume information currently stored in the second print volume buffer 1309, i.e., the print volume information on the first plane image for the leading head. More specifically, the image distribution unit 804 reads the first plane print volume information for the leading head stored in the second print volume buffer 1309, converts it into a negative value, adds the converted value to the first plane multivalued data for the follower head and then sends the addition result as the first plane image data for the follower head to the grayscale level reduction unit 805. At this timer the area from which the image distribution unit 804 reads the print volume information is specified by the selection unit-1 1311 according to an instruction from the selection control unit 1310.

After this, the print volume information generation unit 807 performs the similar processing to that described above on the first plane binary data for the follower head output from the grayscale level reduction unit 805. Then, the result obtained here is added to the print volume information that the image distribution unit 804 has read from the second print volume buffer 1309. The addition result is stored, this time, in the print volume buffer 808. In which area the data generated by the print volume information generation unit 807 is to be stored is specified by the selection unit-2 1302 according to an instruction from the selection control unit 1310.

In the second printing scan, the second plane image data for the leading head is distributed using the print volume information currently stored in the print volume buffer 808. The image distribution unit 804 reads the print volume information from the print volume buffer 808 specified by the selection unit-1 1311, converts it into a negative value and adds the negative value to the multivalued data that was distributed to the second plane of the leading head. Then, based on the data thus obtained, the second plane multivalued imaged data for the leading head is extracted before being sent to the grayscale level reduction unit 805.

The print volume information generation unit 807 performs the similar processing to that described above on the second plane binary data for the leading head output from the grayscale level reduction unit 805. The result thus obtained is added to the print volume information that the image distribution unit 804 has read from the print volume buffer 808. The addition result is stored, this time, in the second print volume buffer 1309. At this time, the area in which to store the data generated by the print volume information generation unit 807 is specified by the selection unit-2 1312 according to an instruction from the selection control unit 1310.

The second plane image data for the follower head is distributed using the print volume information currently stored in the second print volume buffer 1309. At this stage the second print volume buffer 1309 holds a sum of the first and second plane print volume information for the leading head and the first plane print volume information for the follower head. The image distribution unit 804 reads the print volume information that was stored in the second print volume buffer 1309 by the selection unit-1 1311 according to an instruction from the selection control unit 1310. It then converts the print volume information thus read out into a negative value and adds it to the multivalued data distributed to the second plane of the follower head. Then, based on the addition result, the second plane multivalued image data for the follower head is extracted and sent to the grayscale level reduction unit 805.

The print volume information generation unit 807 performs the similar processing to that described above on the second plane binary data for the follower head Bk1 output from the grayscale level reduction unit 805. It then performs a binarization operation in the same way as with the first plane and transfers the binary data obtained to the print buffer 806. Here, the second plane output result from the grayscale level reduction unit 805 is not transferred to the print volume information generation unit 807.

In distributing image data to individual planes, this embodiment is characterized in that a memory, to and from which the print volume information is stored and retrieved, is switched alternately between the second print volume buffer 1309 and the print volume buffer 808. That is, the selection control unit 1310 needs to be able to control the selection unit-1 1311 and the selection unit-2 1312 to switch the destination area for data storage and retrieval each time the plane being processed is changed. The second print volume buffer 1309 needs only to be able to accommodate the print volume information for one plane of the leading head.

It is also required that, if the second print volume buffer 1309 has a smaller capacity than one plane of print volume information for the leading head, the selection control unit 1310 be able to switch the storage destination or retrieval destination at a timing when the second print volume buffer 1309 is empty or full. With this configuration, these two memory areas can be made to function effectively. In that case, however, a process flow control on the leading head and the follower head should be performed respectively. When the second print volume buffer 1309 is full, the operation by the leading head processing to write the print volume information from the print volume information generation unit 807 must be changed. Further, when the second print volume buffer 1309 is empty, the operation by the follower head processing to retrieve the print volume information from the second print volume buffer 1309 must also be changed. These operations need to be controlled through appropriate handshaking among the image distribution unit 804, the second print volume buffer 1309 and the print volume information generation unit 807.

The print volume buffer 808 may also be configured like a ring buffer. It is noted, however, that when new information is written into used print volume information memory address in the print volume buffer 808, a new flow control is required besides the path switching by the selection control unit 1310. These flow controls need to be performed through appropriate handshaking among the image distribution unit 804, the print volume buffer 808 and the print volume information generation unit 807.

In the following, a detailed sequence of steps in performing an M-pass printing using the print head of this embodiment will be described.

Figure 16:
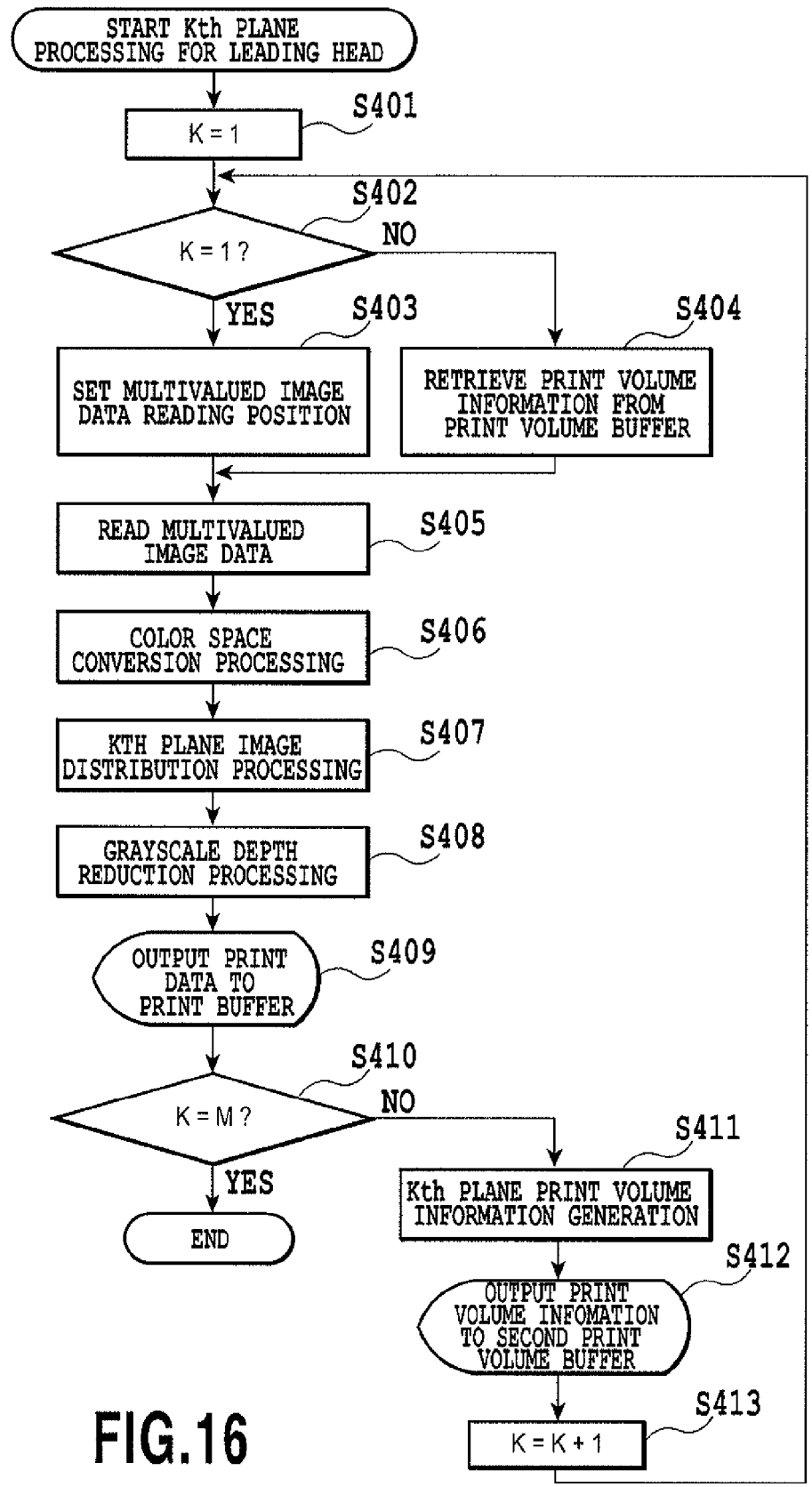
FIG. 16 is a flow chart showing a sequence of steps of image data processing that the image data processing block 711 performs on an arbitrary unit area for Bk1 head, C1 head or M1 head during an M-pass printing in the second embodiment.

FIG. 16 is a flow chart showing a sequence of steps of image data processing that the image data processing block 711 performs on an arbitrary unit area for the leading head (Bk1 head, C1 head or M1 head) during an M-pass printing. This processing executes a sequence of steps almost equal to that explained with reference to the flow chart of the first embodiment shown in FIG. 12. It is noted, however, that the method of reading and storing the print volume information in step S404 and S412 and the method of using the retrieved print volume information in step S407 and S411 slightly differ from those of the first embodiment.

When this processing is started, step S401 sets a variable K representing number of the pass of intended printing scan to 1.

Step S402 checks if the variable K is K=1. If K≠1, the processing moves to step S404 where it retrieves the print volume information on the leading head and the follower head for up to (K−1)th scan that are stored in the print volume buffer 808. Then, the processing jumps to step S405.

When, on the other hand, K is found to be K=1, the processing moves to step S403 where it sets a read start position in the input image buffer 801 from which to start reading multivalued image data contained therein.

The operations of step S405 and step S406 are similar to those of step S105 and step S106 that have been explained with reference to FIG. 11. So, their explanations are omitted here.

The next step S407 performs an image distribution operation to derive Kth pass data for the leading head from the multivalued grayscale data thus obtained. When an M-pass printing is performed using two print heads—the leading head and the follower head—the image data assigned to a Kth plane for the leading head is about 1/(2×M) the grayscale data obtained in step S406. In this embodiment, to this grayscale data is added a negative value of the print volume information obtained in step S404, and the addition result is distributed as Kth plane data for the leading head. If K=1, the print volume information is not retrieved at step S404, in this case, step S407 handles the print volume information as "0".

Step S408 binarizes the distributed multivalued grayscale data by the similar grayscale level reduction operation to that of step S108 explained with reference to FIG. 11.

Step S409 outputs the binarized image data as Kth plane print data for the leading head to the print buffer 806.

Step S410 checks if K=M. If K≠M, the processing moves to step S411 where it generates Kth plane print volume information for the leading head from the Kth plane binary data for the leading head, in preparation for a (K+1)th printing scan, and then adds the Kth plane print volume information for the leading head to the print volume information for up to (K−1)th plane which is read by step S404. Then step S412 stores the addition result obtained here in the second print volume buffer 1309. The processing moves to step S413 where it increments the variable K, before returning to step S402 for the next printing scan.

If step S410 finds that K=M, this means that the current plane is the last plane of the M-pass printing. So, this processing is ended.

Figure 17:
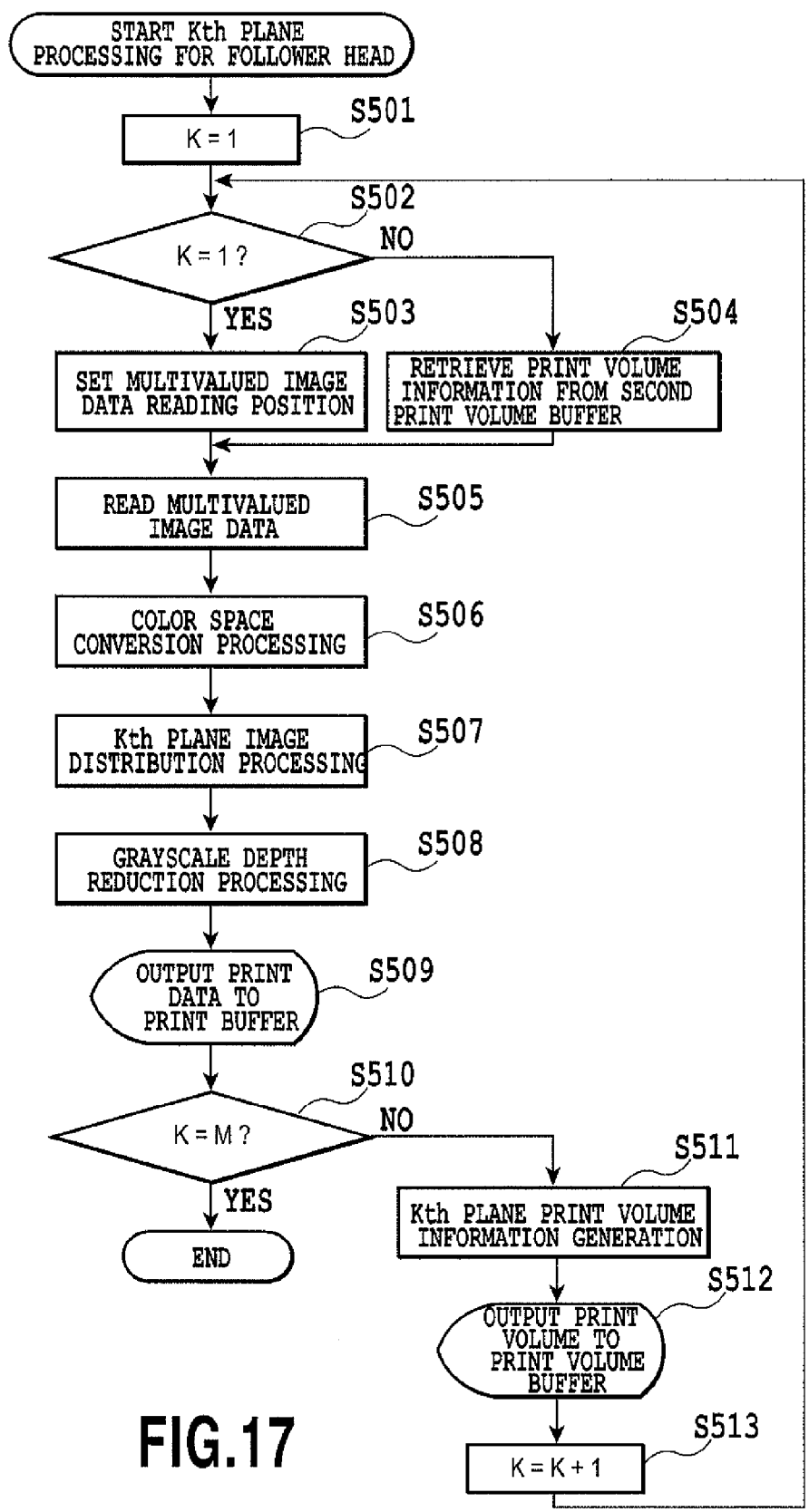
FIG. 17 is a flow chart showing a sequence of steps of image data processing that the image data processing block 711 performs on an arbitrary unit area for Bk2 head, C2 head or M2 head during an M-pass printing in the second embodiment.

FIG. 17 is a flow chart showing a sequence of steps of image data processing that the image data processing block 711 performs on an arbitrary unit area for the follower head (Bk2 head, C2 head or M2 head) during an M-pass printing. This processing executes a sequence of steps almost equal to that explained with reference to the flow chart of the first embodiment shown in FIG. 13. It is noted, however, that the method of reading and storing the print volume information in step S504 and S512 and the method of using the retrieved print volume information in step S507 and S511 slightly differ from those of the first embodiment.

When this processing is started, step S501 sets a variable K representing the pass or printing scan number to 1.

Step S502 checks if the variable K is K=1. If K≠1, the processing moves to step S504 where it retrieves the print volume information stored in the second print volume buffer 1309. Then, the processing jumps to step S505.

When, on the other hand, K is found to be K=1, the processing moves to step S503 where it sets a read start position in the input image buffer 801 from which to start reading multivalued image data contained therein.

The operations of step S505 and step S506 are similar to those of step S105 and step S106 that have been explained with reference to FIG. 11. So, their explanations are omitted here.

The next step S507 performs an image distribution operation to derive Kth pass data for the follower head from the multivalued grayscale data thus obtained. When an M-pass printing is performed using two print heads—the leading head and the follower head—the image data assigned to a Kth plane for the follower head is about 1/(2×M) the grayscale data obtained in step S506. In this embodiment, to this grayscale data is added a negative value of the print volume information obtained in step S504, and the addition result is distributed as Kth plane data for the follower head. If K=1, the print volume information is not retrieved at step S504, in this case, step S507 handles the print volume information as "0".

Step S508 binarizes the distributed multivalued grayscale data by the similar grayscale level reduction operation to that of step S108 explained with reference to FIG. 11.

Step S509 outputs the binarized image data as Kth plane print data for the follower head to the print buffer 806.

Step S510 checks if K=M. If K≠M, the processing moves to step S511 where it generates Kth plane print volume information for the follower head from the Kth plane binary data for the follower head, in preparation for a (K+1)th printing scan, and then adds the generated Kth plane print volume information to the print volume information retrieved by step S504. Then step S512 stores the addition result obtained here in the print volume buffer 808. The processing moves to step S513 where it increments the variable K, before returning to step S502 for the next printing scan.

If step S510 finds that K=M, this means that the current plane is the last plane of the M-pass printing. So, this processing is ended.

This embodiment is characterized in that the second print volume buffer is separated from the print volume information buffer of the first embodiment in order to manage the print volume information using the two memory areas. This configuration allows read accesses and write accesses to/from the second print volume buffer, which form a part of the memory accesses to the print volume information buffer of the first embodiment, to be separated, reducing the overall memory accesses to the RAM 707. Generally, RAM is used as input image buffer and print buffer as well as program memory, and has a variety of uses, for example, for processing print jobs entered from the host interface. So there are not a few systems in which a RAM memory bandwidth forms a bottle neck. An adoption of the configuration of this embodiment can reduce the number of accesses to the RAM 707, which in turn allows for faster printing. In this embodiment the use of a built-in SRAM chip, in which the second print volume buffer is formed, obviates external 2-system RAM chips used to secure a necessary memory bandwidth, resulting in a lower system cost than in the first embodiment. Further, since the built-in SRAM chips are generally faster than the external RAM chips, the second print volume buffer access can be made in a shorter time, contributing to a faster printing operation.

(Third Embodiment)

In this embodiment, the print volume buffer 808 of the first embodiment is divided into two or three buffers (first print volume information storage unit, second print volume information storage unit and third print volume information storage unit), as in the second embodiment. One of the divided buffers is used to store print volume information that was generated based on the image data created for the leading head (hereinafter called a second print volume buffer). The internal construction of a serial type ink jet printing apparatus used in this embodiment and the construction of the print head are the same as those of the first embodiment described with reference to FIG. 1 and FIG. 6. The control configuration of the printing apparatus is also the same as that of the second embodiment described with reference to the block diagram of FIG. 14.

Figure 18:
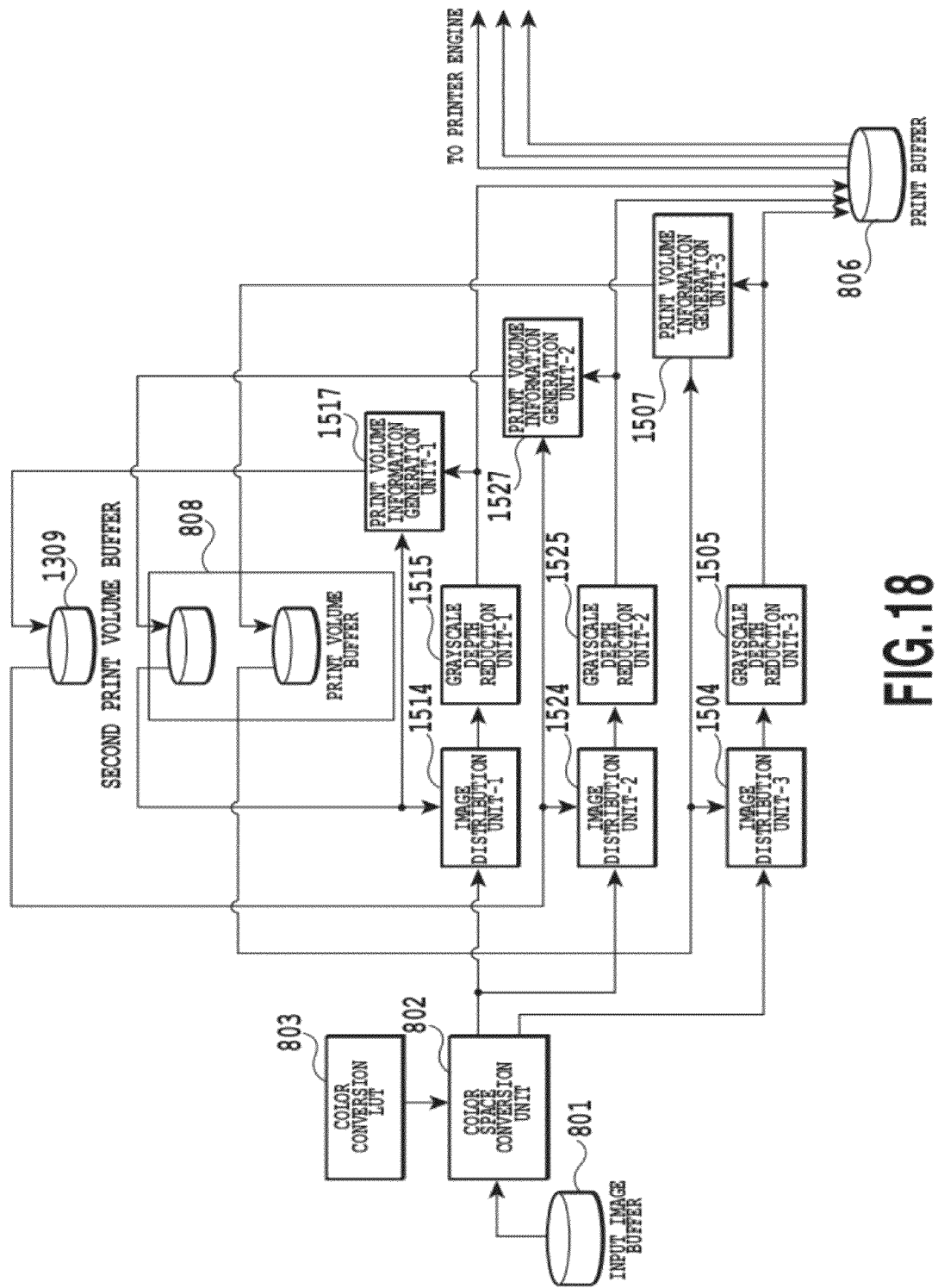
FIG. 18 is a block diagram explaining the construction within an image data processing block 711 in the third embodiment, connections of the block with various buffers and image processing performed by the block.

FIG. 18 is a block diagram showing the construction within an image data processing block 711 of this embodiment, connections of the block with various buffers and image processing performed by the block. What differs from the second embodiment is that the image data processing block 711 of the third embodiment newly includes a plurality of image distribution units, a plurality of grayscale level reduction units and a plurality of print volume information generation units and that the selection control unit and the selection unit-1 and selection unit-2 shown in FIG. 15 are eliminated.

An image distribution unit-1 1514 (first image data distribution unit), a grayscale level reduction unit-1 1515 (first conversion unit) and a print volume information generation unit-1 1517 (first print volume information generation unit) are circuits for the leading heads (Bk1, C1 and M1). The image distribution unit-1 1514 is connected so as to read print volume information from the print volume buffer 808. The print volume information generation unit-1 1517 is connected so as to retrieve the same print volume information as that retrieved by the image distribution unit-1 from the print volume buffer 808 and store the generated print volume information in the second print volume buffer 1309. In an M-pass printing, the image data processing that the image data processing block 711 executes over a unit area for the leading head is similar to the flow chart explained with reference to FIG. 16 of the second embodiment. So, its explanation is omitted here.

What differs from the second embodiment is that since the third embodiment has the image distribution unit-1 1514, the grayscale level reduction unit-1 1515 and the print volume information generation unit-1 1517, all dedicated for the leading head, there are provided paths dedicated to the print volume buffer 808 and the second print volume buffer 1309, rendering the switching of access paths unnecessary. When the second print volume buffer 1309 becomes full, the flow control is brought into action to delay the operation of writing the print volume information from the print volume information generation unit-1 1517. At this time, the hardware of the flow control may be mounted in the second print volume buffer 1309 and the print volume information generation unit-1 1517, with an appropriate handshake established between them.

An image distribution unit-2 1524 (second image data distribution unit), a grayscale level reduction unit-2 1525 (second conversion unit) and a print volume information generation unit-2 1527 (second print volume information generation unit) are circuits for the follower head. The image distribution unit-2 1524 is connected so as to read print volume information from the second print volume buffer 1309. The print volume information generation unit-2 1527 is so connected as to retrieve the same print volume information as that retrieved by the image distribution unit-2 from the second print volume buffer 1309 and store the generated print volume information in the print volume buffer 808. In an M-pass printing, the image data processing that the image data processing block 711 executes over a unit area for the follower head is similar to the flow chart explained with reference to FIG. 17 of the second embodiment. So, its explanation is omitted here.

What differs from the second embodiment is that since the third embodiment has the image distribution unit-2 1524, the grayscale level reduction unit-2 1525 and the print volume information generation unit-2 1527, all dedicated for the follower head, there are provided paths dedicated to the print volume buffer 808 and the second print volume buffer 1309, rendering the switching of access paths unnecessary.

An image distribution unit-3 1504 (third image data distribution unit), a grayscale level reduction unit-3 1505 (third conversion unit) and a print volume information generation unit-3 1507 (third print volume information generation unit) are circuits for one-head arrangement for one color, i.e., Y head and Gy head. In an M-pass printing, the image data processing that the image data processing block 711 executes over a unit area for the Y head or Gy head is similar to the flow chart explained with reference to FIG. 11 of the first embodiment. So, its explanation is omitted here.

In this embodiment, the print volume buffer 808 is so constructed that, as shown in FIG. 18, the content of data stored in the print volume information buffer can be updated as required, making it possible to reduce the amount of memory used. For example, the print volume buffer may be configured in the form of a ring buffer so that the leading head processing can write print volume information into those memory areas from which information referenced by the image distribution unit-1 1514 has been read out. When the updating of print volume information by the print volume information generation unit-2 1527 for the follower head catches up with the reading of the leading head print volume information, the flow control is activated to delay the operation of writing the print volume information from the print volume information generation unit-2 1527. The hardware of the flow control may be mounted in the print volume buffer 808 and the print volume information generation unit-2 1527, with an appropriate handshake established between them.

With the configuration of FIG. 18, the print volume information generated for the leading head can be written into the second print volume buffer 1309, followed by the follower head processing being executed. This allows the Kth plane processing shown in FIG. 16 and FIG. 17 to be executed almost parallelly. That is, because dedicated circuits for the leading head and the follower head are provided, the processing can be made faster than the preceding embodiments.

Although the second embodiment and the third embodiment employ the configuration in which the second print volume buffer area is secured in the internal SRAM controller 1217 and the internal SRAM 1218, the advantages of these embodiments can be produced not just by this configuration. The second print volume buffer area may, for example, be secured in the external RAM, as in the first embodiment. It is also possible to secure the second print volume buffer area in another form of memory composed of FIFO and FIFO controller. In either case, the only requirement is that an enough memory bandwidth be secured in external RAM chips so as not to cause a processing performance bottleneck. This in turn allows for effective, smooth processing, intended by these embodiments.

In the above embodiments the head unit of FIG. 6 has been taken up as an example. The head unit includes a one-head arrangement, such as Gy and Y print heads, and a two-head arrangement having two print heads of the same ink color placed side by side, such as Bk1 or 2, C1 or 2 and M1 or 2 print heads. It is, however, noted that the present invention can be effectively applied also to a configuration where all of the heads mounted in the head unit are two-array heads for every ink color.

While in the above embodiments the head arrangement has been described in which two heads of the same ink color are mounted in one head unit, the present invention can also be effectively applied to a configuration in which three or more heads of the same ink color are mounted in one head unit. When performing an M-pass printing using such a configuration, the image distribution unit needs only to distribute multivalued image data to M×N planes (N is the number of heads ejecting the same ink color).

Further, while in the above embodiments an example printing apparatus having a plurality of print heads arrayed side by side has been described, the plurality of print heads in which a plurality of printing element ejecting the same ink are arranged in a width direction of the print medium (so-called line head) may be adopted the present invention used. In that case, processing needs to be performed to satisfy the above head relationship between the first printing element array that is positioned upstream of the print medium conveying direction and the second printing element array that is positioned downstream of the print medium conveying direction.

Although in the above embodiments multivalued image data has been described to be converted into binary data by the grayscale level reduction unit, the grayscale levels created by the grayscale level reduction unit of this invention may not necessarily be binary levels. For example, this invention can also be applied to a configuration in which the multivalued image data is converted into any form of data that can be dealt with by the printer engine, such as three-level or 4-level data.

Further, although in the above embodiments the print head 101 has been described to form an image while traveling in one direction of printing scan, this invention can also be effectively applied where an image is formed in bidirectional printing scans. In that case, the leading head and the follower head need to be switched when the bidirectional printing scan is switched between a forward scan and a backward scan. This arrangement can further increase the image output speed.

While in the above embodiments the filter operation during the print volume information generation has been described to be performed by the print volume information generation unit, this invention is not limited to this configuration. For example, the image distribution unit may perform the filter operation on the print volume information read from the print volume buffer and then use the filtered print volume information during the image distribution. This means that the same effect as that of this embodiment can be produced, whether the print volume information is stored in the print volume buffer and the second print volume buffer before or after being subjected to the filter operation.

Further, although the above embodiments use an ink jet type printing apparatus, this invention is not limited to such a printing apparatus. This invention can be appropriately applied to any dot alignment type printing apparatus that has a plurality of printing elements for printing dots on a print medium and which describes an image by making desired dot arrangements.

Further, in the above embodiments, while the image processing apparatus that executes the image processing characteristic of this invention has been explained by taking as an example a printing apparatus having an image processing function, this invention is not limited to this configuration. For example, the image processing of this invention may be executed by a host device and then the binarized print data entered into the printing apparatus. This invention is also applicable to another configuration in which pictures taken as by digital cameras and graphic images are directly entered into the printing apparatus, rather than through a host device, and in which all image processing including the operations described in the above embodiments are executed by the printing apparatus. The host device in the former configuration and the printing apparatus in the latter configuration constitute the image processing apparatus of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-197771, filed Jul. 31, 2008 which is hereby incorporated by reference herein in its entirety.

What is claimed is:

1. An image processing method, that uses a first printing element array and a second printing element array both ejecting the same kind of ink and which performs a plurality of printing scans over a unit area of a print medium to form an image on the unit area, comprising:
- a data storage step to store multivalued image data corresponding to the unit area;
- a first distribution step to distribute, based on print volume information stored in a first print volume storage unit, the multivalued image data for a Kth printing scan over the unit area to a first plane for the first printing element array;
- a second distribution step to distribute, based on print volume information stored in a second print volume information storage unit, the multivalued image data for a Kth printing scan over the unit area to a second plane for the second printing element array;
- a first conversion step to convert the multivalued image data distributed to the first plane by said first distribution step into binary print data;
- a second conversion step to convert the multivalued image data distributed to the second plane by the second distribution step into binary print data;
- a step to execute the Kth printing scan over the unit area according to the print data by activating the first printing element array and the second printing element array in that order;
- a first information generation step to, after the binary print data is generated by said first grayscale level reduction step, update the print volume information on the unit area according to the generated print data and store the updated print volume information in the second print volume storage unit; and
- a second information generation step to, after the binary print data is generated by said second conversion step, update the print volume information on the unit area according to the generated print data and store the updated print volume information in the first print volume storage unit.

2. An image processing apparatus, that uses a first printing element array and a second printing element array both ejecting the same kind of ink and which performs a plurality of printing scans over a unit area of a print medium to form an image on the unit area, comprising:
- a data storage unit which stores multivalued image data corresponding to the unit area;
- an information storage unit which stores print volume information;
- a distribution unit which distributes, based on print volume information stored in said information storage unit, the multivalued image data for a Kth printing scan over the unit area to a first plane for the first printing element array and a second plane for the second printing element array;
- a conversion unit which converts the multivalued image data distributed to the planes by said distribution unit into binary print data;
- an unit to execute the Kth printing scan over the unit area according to the print data by activating the first printing element array and the second printing element array in that order; and
- a generation unit which, after the binary print data are generated by said conversion unit, updates the print volume information on the unit area according to the generated print data and store the updated print volume information in said information storage unit;

wherein said distribution unit distributes the multivalued image data to the first plane according to the print volume information for up to (K−1)th printing scan and distributes the multivalued image data to the second plane according to the print volume information updated after the grayscale level reduction unit has generated the binary print data for the first plane.

3. The image processing apparatus according to claim 2, wherein said information storage unit has a first information storage area and a second print volume information storage area;
wherein said generation unit stores in the first information storage area the print volume information updated after said conversion unit has generated the binary print data for the first plane and stores in the second information storage area the print volume information updated after said conversion unit has generated the binary print data for the second plane;
wherein said distribution unit distributes the multivalued image data to the first plane according to the print volume information stored in the second information storage area and to the second plane according to the print volume information stored in the first information storage area.

4. An image processing apparatus, that uses a first printing element array and a second printing element array both ejecting the same kind of ink and which performs a plurality of printing scans over a unit area of a print medium to form an image on the unit area, comprising:
- a data storage unit which stores multivalued image data corresponding to the unit area;
- a first information storage unit which stores print volume information;
- a second information storage unit which stores print volume information;
- a first distribution unit which distributes, based on print volume information stored in a first information storage unit, the multivalued image data for a Kth printing scan over the unit area to a first plane for the first printing element array;
- a second distribution unit which distributes, based on print volume information stored in said second information storage unit, the multivalued image data for a Kth printing scan over the unit area to a second plane for the second printing element array;
- a first conversion unit which converts the multivalued image data distributed to the first plane by said first distribution unit into binary print data;
- a second conversion unit which converts the multivalued image data distributed to the second plane by said second distribution unit into binary print data;
- an unit which executes the Kth printing scan over the unit area according to the print data by activating the first printing element array and the second printing element array in that order;
- a first information generation unit which, after the binary print data is generated by said first conversion unit, updates the print volume information on the unit area according to the generated print data and store the updated print volume information in said second information storage unit; and
- a second information generation unit which, after the binary print data is generated by said second conversion unit, updates the print volume information on the unit area according to the generated print data and store the updated print volume information in said first information storage unit.

5. The image processing apparatus according to claim 4, further using a third printing element array that ejects an ink different from the one used by the first printing element array and the second printing element array, and further comprising:
- a third information storage unit which stores print volume information;
- a third distribution unit which distributes, based on print volume information stored in said third information storage unit, the multivalued image data for a Kth printing scan over the unit area to a plane for the third printing element array;
- a third conversion unit which converts the multivalued image data distributed to the plane by said third distribution unit into binary print data;
- an unit which executes the Kth printing scan over the unit area according to the print data by using the third printing element array; and
- a third information generation unit which, after the binary print data is generated by said third conversion unit, updates the print volume information on the unit area according to the generated print data and store the updated print volume information in said third information storage unit.

6. An image processing method, that uses a first printing element array and a second printing element array both ejecting the same kind of ink and which performs a plurality of printing scans over a unit area of a print medium to form an image on the unit area, comprising:
- a data storage step to store multivalued image data corresponding to the unit area;
- a distribution step to distribute, based on print volume information stored in a print volume information storage unit, the multivalued image data for a Kth printing scan over the unit area to a first plane for the first printing element array and a second plane for the second printing element array;
- a conversion step to convert the multivalued image data distributed to the planes by said distribution step into binary print data;
- a step to execute the Kth printing scan over the unit area according to the print data by activating the first printing element array and the second printing element array in that order; and
- a generation step to, after the print data is generated by said conversion step, update the print volume information on the unit area according to the generated print data and store the updated print volume information in the print volume storage unit;

wherein the distribution step distributes the multivalued image data to the first plane according to the print volume information for up to (K−1)th printing scan and distributes the multivalued image data to the second plane according to the print volume information updated after said conversion step has generated the binary print data for the first plane.

* * * * *